United States Patent
Fraccaroli et al.

(10) Patent No.: US 10,056,054 B2
(45) Date of Patent: Aug. 21, 2018

(54) METHOD, SYSTEM, AND APPARATUS FOR OPTIMISING THE AUGMENTATION OF RADIO EMISSIONS

(71) Applicants: Federico Fraccaroli, Irving, TX (US);
Brian Joseph Bochicco, Chapel Hill, NC (US)

(72) Inventors: Federico Fraccaroli, Irving, TX (US);
Brian Joseph Bochicco, Chapel Hill, NC (US)

( * ) Notice: Subject to any disclaimer, the term of this patent is extended or adjusted under 35 U.S.C. 154(b) by 295 days.

(21) Appl. No.: 14/809,221

(22) Filed: Jul. 26, 2015

(65) Prior Publication Data

US 2016/0005233 A1    Jan. 7, 2016

Related U.S. Application Data

(63) Continuation-in-part of application No. 14/323,983, filed on Jul. 3, 2014, now Pat. No. 9,092,898.

(51) Int. Cl.
*G09G 5/00* (2006.01)
*G09G 3/00* (2006.01)
(Continued)

(52) U.S. Cl.
CPC ........... *G09G 5/003* (2013.01); *G02B 27/017* (2013.01); *G02B 27/0172* (2013.01);
(Continued)

(58) Field of Classification Search
CPC .......... G06F 3/011; G06F 3/013; G06F 3/017; G06F 3/005; G06F 3/014; G06F 3/012; G06F 3/0202; G06F 3/0221; G06F 3/03541; G06F 3/045; G06F 1/163; G06F 1/1673; G06F 1/1624; G06F 1/1626; G06F 1/1639; G06F 1/1647; G06F 1/1652; G06F 1/1666; G06F 1/1671; G06F 1/1694; G02B 5/30; G02B 27/017; G02B 27/0093; G02B 27/0172; G02B 27/0176;
(Continued)

(56) References Cited

U.S. PATENT DOCUMENTS 8,723,888 B2   5/2014 Cudalbu
9,002,400 B2   4/2015 Kim
(Continued)

FOREIGN PATENT DOCUMENTS

WO    2015067982 A1   5/2015

*Primary Examiner* — Nalini Mummalaneni
(74) *Attorney, Agent, or Firm* — Federico Fraccaroli

(57) ABSTRACT

In accordance with one example embodiment of the present invention, a plurality of antennas that are arranged according to a predetermined geometrical pattern receive radio emission signals from nearby radio emitting objects. Said radio emission signals are used, at least in part, to exhibit augmented reality indicia on a display, wherein the position of said augmented reality indicia on said display approximately indicates the direction of arrival of said radio emission signals and is organized or corrected according to predetermined criteria. One or more databases, either positioned on the cloud, or on the headset, or at an intermediate apparatus, may store the data, settings, and authorizations associated with said radio emitting object to permit and regulate the representation of said augmented reality indicia.

20 Claims, 12 Drawing Sheets

(51) Int. Cl.
    *G02B 27/01*  (2006.01)
    *G06F 3/0487* (2013.01)
    *G06F 1/16*   (2006.01)

(52) U.S. Cl.
    CPC ............ *G06F 1/163* (2013.01); *G06F 1/1698* (2013.01); *G06F 3/0487* (2013.01); *G09G 3/003* (2013.01); *G02B 2027/014* (2013.01); *G02B 2027/0178* (2013.01); *G09G 2370/022* (2013.01); *G09G 2370/16* (2013.01)

(58) Field of Classification Search
    CPC ...... G02B 2027/0178; G02B 2027/014; G02B 2027/0187; G02B 2027/0118; G02B 2027/0138; H04M 1/0268; H04M 1/05; H04M 1/23; H04M 1/6041; H04M 1/7253; H04M 2250/16; H04M 2250/18
    See application file for complete search history.

(56) References Cited

U.S. PATENT DOCUMENTS

| | | | | |
|---|---|---|---|---|
| 9,096,920 B1* | 8/2015 | Gomez | .................... | C23C 4/06 |
| 9,541,625 B2* | 1/2017 | McSheffrey | .............. | G01S 1/02 |
| 2011/0161875 A1 | 6/2011 | Kankainen | | |
| 2011/0173576 A1 | 7/2011 | Murphy | | |
| 2012/0019557 A1 | 1/2012 | Aronsson | | |
| 2012/0075341 A1 | 3/2012 | Sandberg | | |
| 2012/0082039 A1 | 4/2012 | Li | | |
| 2012/0092369 A1 | 4/2012 | Kim | | |
| 2013/0044130 A1* | 2/2013 | Geisner | .................... | G09G 5/00 |
| | | | | 345/633 |
| 2013/0088516 A1 | 4/2013 | Ota | | |
| 2013/0187834 A1* | 7/2013 | Nohara | .................... | G01S 7/04 |
| | | | | 345/8 |
| 2013/0194141 A1* | 8/2013 | Okajima | ................ | G02C 11/10 |
| | | | | 343/718 |
| 2013/0335301 A1 | 12/2013 | Wong | | |
| 2014/0055488 A1* | 2/2014 | Masters | .................. | G06F 3/147 |
| | | | | 345/633 |
| 2014/0168056 A1 | 6/2014 | Swaminathan | | |
| 2014/0168262 A1 | 6/2014 | Forutanpour | | |
| 2014/0267419 A1 | 9/2014 | Ballard | | |
| 2014/0292653 A1 | 10/2014 | Kamba | | |
| 2014/0368533 A1 | 12/2014 | Salter | | |
| 2015/0116316 A1 | 4/2015 | Fitzgerald | | |
| 2015/0181388 A1* | 6/2015 | Smith | .................... | H04W 4/026 |
| | | | | 455/426.1 |

* cited by examiner

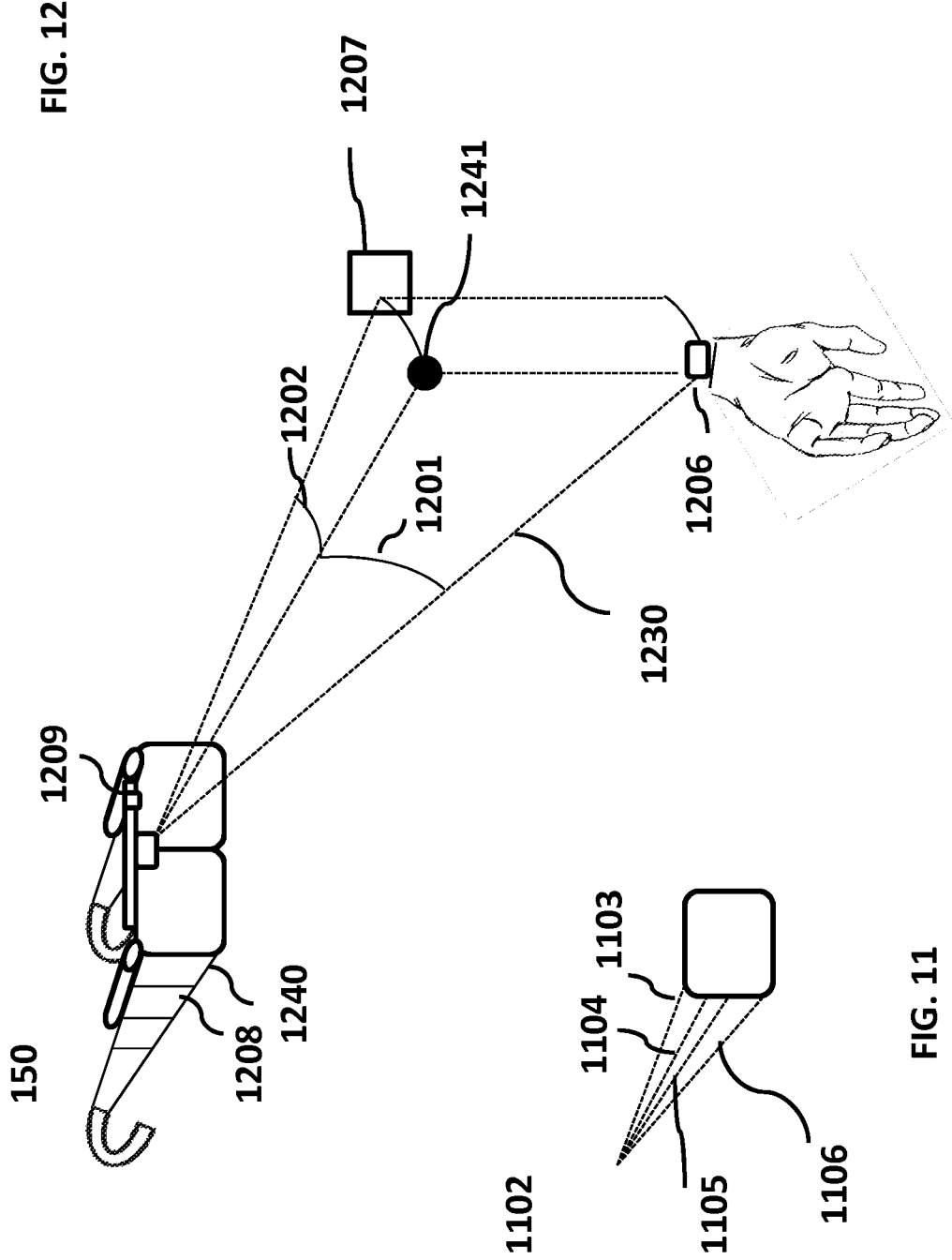

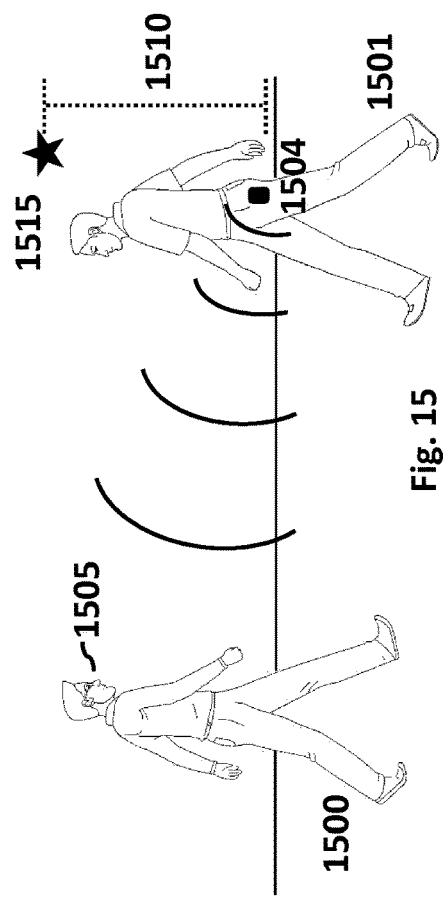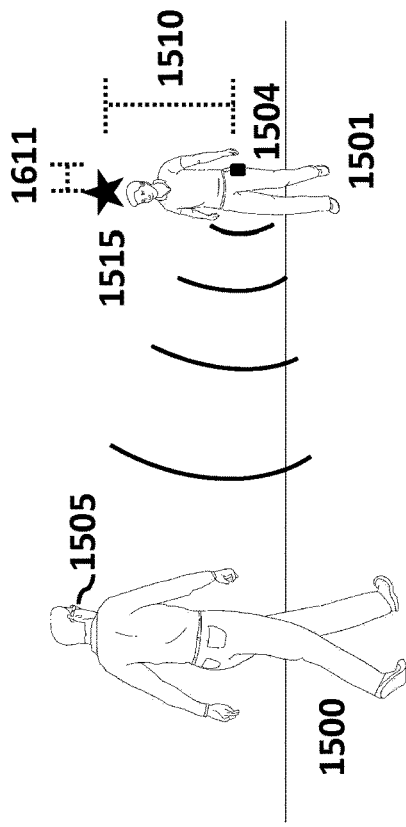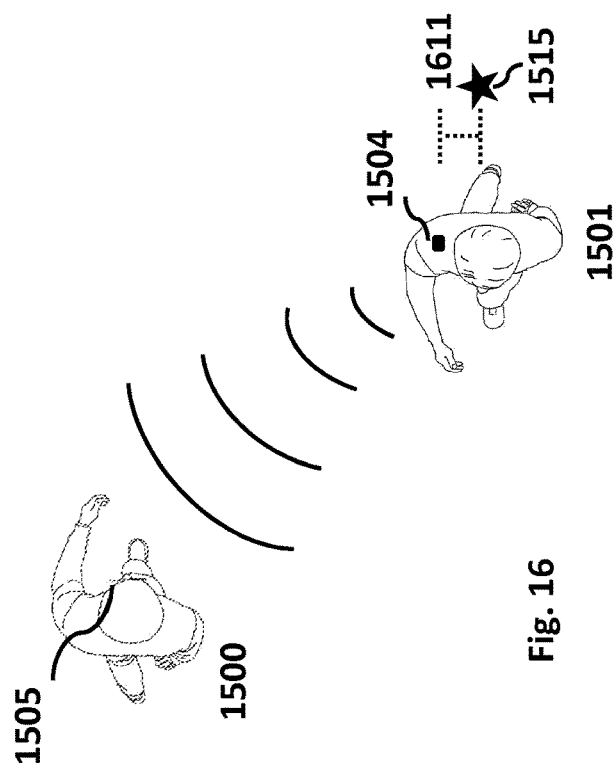

METHOD, SYSTEM, AND APPARATUS FOR OPTIMISING THE AUGMENTATION OF RADIO EMISSIONS

CLAIM OF PRIORITY

This application is a Continuation-in-Part of pending U.S. patent application Ser. No. 14/323,983, filed on Jul. 3, 2014, and titled "METHOD, SYSTEM, AND APPARATUS FOR THE AUGMENTATION OF RADIO EMISSIONS," which is incorporated herein by reference in its entirety.

TECHNICAL FIELD

The present application relates generally to a method, a system, and an apparatus to facilitate the discovery of Radio Emitting Objects and the representation of content associated to said Radio Emitting Objects.

BACKGROUND

Augmented reality (AR), and synonymously described as augmented vision, has been billed as one of the next big waves of technology advancement. For several years, many companies ranging from Yelp to Layar, from Wikitude to Blippar, have commercialized AR applications on handheld portable devices. For example, Yelp's Monocle leverages a smart phone's gyroscope and GPS signaling mechanisms in order to augment a user's field of view (FOV) with nearby restaurant information.

The concept of AR has extended to head-mounted displays (HMD). While the introduction of Google Glass in 2013 has recently generated mass-market interest, headworn AR devices have actually been researched and developed for decades. Prior to Google, headworn AR companies such as Lumus, Microvision, and Vuzix, had already begun to commercialize its systems, often targeting niche, industry-focused applications, specifically targeting military, medical, and corporate applications. However, recently, consumer-oriented applications, like receiving email alerts within one's FOV, have been discussed and deployed in the marketplace.

With AR head-mounted display systems becoming smaller, sleeker, and less ostentatious, it is estimated that AR head-mounted systems will "cross the chasm" over the next several years. Accordingly, there has been continued development towards integrating one or more existing technologies into AR systems, ranging from image and gestural recognition, voice identification, position and orientation tracking, ad hoc network forming, social networking, and personalized content delivery.

Moreover, as described in U.S. patent application Ser. No. 14/153,032 titled "Method, System and Apparatus for Adapting the Functionalities of a Connected Object Associated with a User ID," filed on Jan. 11, 2014 (and having the same first named inventor as the present application), a connected object can be a proxy for a user or it can configure in accordance with a user profile.

All the patents, patent applications, standards and published documents mentioned in this patent application are incorporated herein by reference in their entirety. Furthermore, where a definition or use of a term in a document that is incorporated by reference is inconsistent or contrary to the definition of that term provided herein, the definition of that term provided herein applies and the definition of that term in the reference does not apply.

SUMMARY

Various aspects of examples of the invention are set out in the claims.

According to a first aspect of the present invention, a head mounted display apparatus, comprises at least a display configured to display augmented reality indicia, at least one processor, at least one non-transitory computer-readable medium including computer program instructions where the at least one non-transitory computer-readable medium and the computer program instructions configured to, with the at least one processor, cause the apparatus to perform at least the following: processing an electromagnetic signal that is carrying a code that is received by a plurality of antennas that are attached to said head mounted display apparatus from a radio emitting object wherein said antennas exhibit at least some directional gain in a three dimensional space, comparing said electromagnetic signal that is carrying a code as received at each one of said plurality of antennas, determining as a result of said comparing, a direction of arrival of said electromagnetic signal carrying a code; processing augmented reality indicia associated with said code wherein the associations are stored in at least one database, and exhibiting said augmented reality indicia on said display in an area that indicates said direction of arrival of said electromagnetic signal.

According to a second aspect of the present invention, a method comprises at least partially controlling the associations of augmented reality indicia with a code that is stored in a database, wherein said code is carried by an electromagnetic signal to be received by a head mounted display apparatus wherein said head mounted display apparatus is adapted to process said electromagnetic signal wherein said electromagnetic signal is received by a plurality of antennas that are attached to said head mounted display apparatus from a radio emitting object, wherein said antennas exhibit at least some directional gain in a three dimensional space, compare data related to the reception of said electromagnetic signal as received at each one of said plurality of antennas, determine as a result of said comparing a direction of arrival of said electromagnetic signal carrying said code, process said augmented reality indicia corresponding to said code, and exhibit said augmented reality indicia on said display in an area that indicates said direction of arrival of said electromagnetic signal carrying said code.

According to a third aspect of the present invention, a computer software system having a set of instructions for controlling at least one general-purpose digital computer in performing desired functions comprising a set of instructions formed into each of a plurality of modules, each modules comprising a process for at least partially controlling the associations of augmented reality indicia with a code that are stored in a database wherein said code is carried by an electromagnetic signal emitted from a radio emitting object that can be received by a head mounted display apparatus wherein said head mounted display apparatus is adapted to process an electromagnetic signal that is carrying said code that is received by a plurality of antennas that are attached to said head mounted display apparatus wherein said antennas exhibit at least some directional gain in a three dimensional space, compare said electromagnetic signal that is carrying a code as received at each one of said plurality of antennas, determine as a result of said comparing a direction of arrival of said electromagnetic signal carrying a code, process augmented reality indicia associated with said code wherein said associations are stored in at least one database, and exhibit said augmented reality indicia on said display in an area that indicates the direction of arrival of said electromagnetic signal that is carrying said code.

According to a fourth aspect of the invention, a method encompasses facilitating the receiving an electromagnetic signal from a radio emitting object by a plurality of antennas positioned on a head-mounted display apparatus that is comprising at least a display configured to display augmented reality indicia, wherein said electromagnetic signal is carrying a code, facilitating the processing of said electromagnetic signal as received at each one of said plurality of antennas, facilitating the determining, as a result of said processing, of positional information pertaining to said radio emitting object relative to said head mounted display, facilitating the generation of augmented reality indicia based on associations between said augmented reality indicia and said code, wherein said associations are stored in at least one database, facilitating the outputting of said augmented reality indicia on said display based, at least in part, on said positional information of said radio emitting object relative to said head mounted display, wherein said outputting of said augmented reality indicia on said display is corrected as compared to said positional information, at least in part, according to a predetermined criteria.

BRIEF DESCRIPTION OF THE DRAWINGS

For a more complete understanding of example embodiments of the present invention, reference is now made to the following descriptions taken in connection with the accompanying drawings in which:

FIG. 11 represents a multi-antenna arrangement along a temple portion of the HMD;

FIG. 12 illustrates a system-level representation depicting an AR indicia correction corresponding to a Radio Emitting Object;

FIGS. 15-17 illustrate side, aerial, and perspective views of a scene depicting how AR indicia corrections take place along multiple axes.

GLOSSARY

Head mounted Display (HMD)—a head mounted device that displays augmented reality content within a user's field of vision;

AR indicia—augmented reality content that, in one implementation, is displayed in a user's HMD; it can be displayed also via other means such as, e.g., a vehicle windshield;

The field of vision (abbreviated FOV) is the extent of the observable world that is seen at any given moment. In case of an optical instruments such as the HMD , it is a solid angle through which a user can observe the world; in some implementations the FOV can coincide with the electronic display that is capable of visualizing AR indicia; in other implementations the FOV is a superset or subset of said display;

Radio Emitting Object—a transmitter that broadcasts an ID code associated with an object, directly or indirectly connected to said object; for example, a person, a retail item, a moving car may represent a Radio Emitting Object as long as each broadcasts an associated ID code; in some implementations a Radio Emitting Object may broadcast said ID as a result of an interrogation, e.g., an RF-ID interrogation;

Object Cloud—a collection of one or more persons, items, or devices that have established their presence in a shared location; the individual objects may comprise Radio Emitting Objects, or other non-radio emitting objects which may signify their presence via GPS or other online based check-in methodologies;

Master Radio Emitting Object—a class of Radio Emitting Objects which broadcasts an ID code that corresponds to an Object Cloud;

User Profile—A user profile is a collection of data for the display of information associated with a specific user, or the customization of an output according to said collection of data. A profile refers therefore to the explicit digital representation of a person's identity.

Synthesized information—a representation of one or more objects in a broadcast signal; for example, synthesized information may include aggregated amounts of objects, availability of one or more objects, averages or trends associated with one or more objects, ownership of one or more objects, instructional information associated with one or more objects, business offers associated with one or more objects, and common linkages between one or more objects. In some embodiments, objects may represent or be proxies for users. For example, smart phones carried by users can emit a code that can be received by an access point. Information related to those users can be aggregated and sent via a Master Radio Emitting Object.

DETAILED DESCRIPTION OF THE DRAWINGS

An example embodiment of the present invention and its potential advantages are understood by referring to FIGS. 1 through 10 of the drawings.

Figure 1:
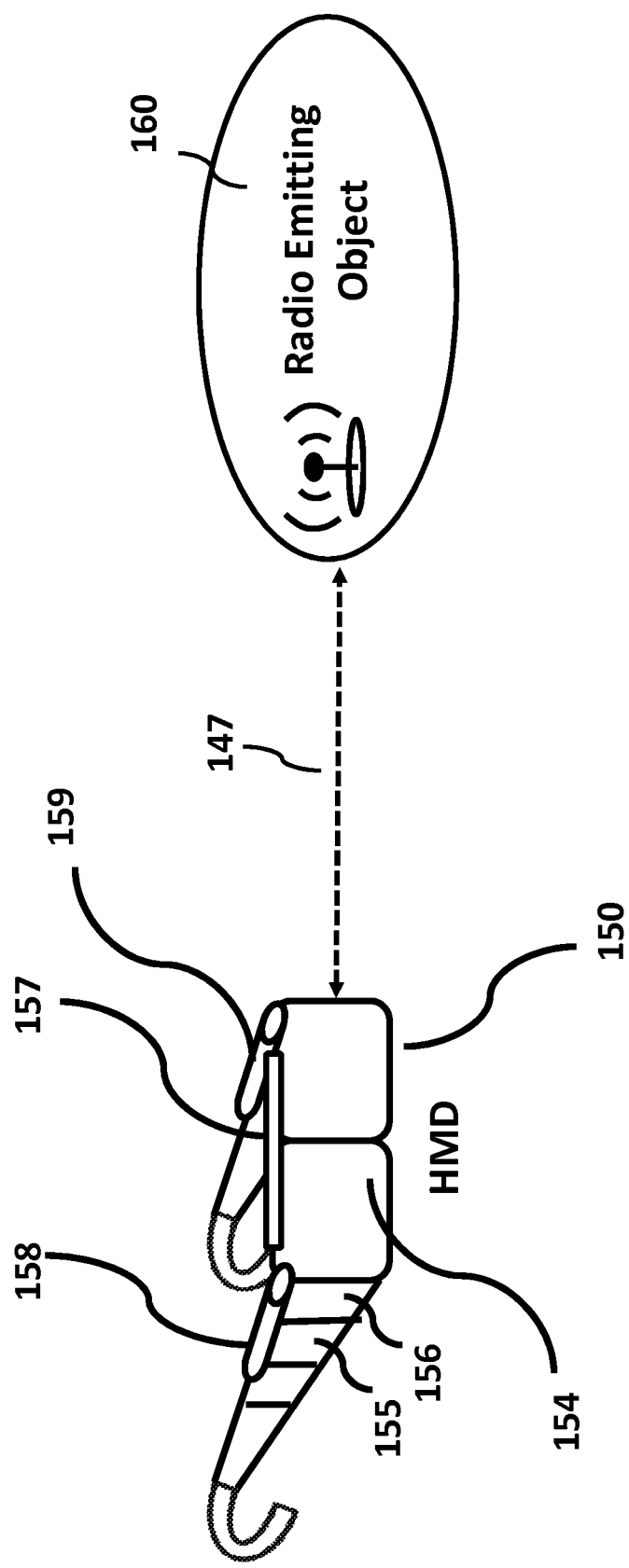
FIG. 1 provides an example of a system-level representation of the present invention.

FIG. 1 describes one possible system embodiment of the invention.

A Radio Emitting Object 160 represents any object or item that can wirelessly transmit signals to a head mounted display (HMD) 150. The person skilled in the art will understand that a Radio Emitting Object 160 is a generic term to define a large class of apparatuses that may employ different frequencies and modulation techniques Infrared, microwave, or radio bands (licensed or unlicensed) or even visible light may comprise the emitted frequency ranges. The signals emitted by the radio-emitting source may be modulated using phase-shift keying, frequency-shift keying, amplitude-shift keying, quadrature amplitude modulation, or any other comparable modulation technique.

A Radio Emitting Object 160 may use one or more antennas to send signals to an HMD 150 via a Wireless Communication Link 147. For the purposes of the present invention, a Radio Emitting Object 160 can be associated with any living or non-living entity, regardless if said entity is stationary or on the move. Accordingly, said Radio Emitting Object 160 can be physically connected, directly or indirectly, to both animate and inanimate objects. For example, a Radio Emitting Object 160 can be affixed to or indirectly connected to, objects such as retail items, shipping pallets, motor vehicles, buildings, entry and exit points, pets, and people. In another example, a Radio Emitting Object 160 may be embedded in a traditional smart phone using the Bluetooth radio standard. In another embodiment, it can be dedicated hardware in the form of a radio emitting bracelet or smart watch that is worn by a user. In another embodiment, it can be a stationary object coupled with goods or locations.

In one possible implementation, active or semi active RF-ID tags can be used. Active RFID tags may comprise of a radio transmitter and a power source, e.g. a miniature battery. Because Active RFID Tags include a radio transmitter and a power source, they are capable of transmitting over a greater range compared to other systems. Active RFID tags can hold a significant amount of information that can be transmitted and are typically more expensive. Active RFID tags can transmit motion data, tamper data, and tag age. Some models of Active RFID tags are capable of transmitting telemetry data such as temperature and humidity. In order to preserve battery life, Active RFID tags may not continuously transmit. Rather, they may transmit at a rate of 15 seconds when at rest, and faster if a motion sensor has detected movement.

In another possible exemplary embodiment, the invention may use Apple's iBeacon technology as the Radio Emitting Object 160, in which an iBeacon represents a low-powered transmitter that utilizes Bluetooth low energy (BLE) proximity sensing. In a simplified form, an iBeacon transmitter performs the following functions: 1) communicate an ID code to a receiver apparatus and 2) provide means for said receiving apparatus to determine its distance from said iBeacon emitting source. In an even more basic description, an iBeacon represents a Radio Emitting Object 160 that transmits a "Here I am" type of signal from its current location. Such "Here I am" signals can be transmitted outwardly from the iBeacon as far as only a few centimeters to over 10 meters away. iBeacon signals are comprised of a Universally Unique Identifier (UUID), which is used to distinguish what AR application may "see" the iBeacon, as well as major and minor values. These major and minor values are placeholders for the developers to characterize— as they see fit—information about the iBeacons. In one commercial example, the major values may identify a product type or class and the minor values may identify a specific product individually. For example, in a retail setting, these different sets of identification codes may be used by the retailer to identify a plurality of iBeacons within a single retail store location (i.e. via the iBeacon's major values) or to identify a specific iBeacon within said retail location (i.e. via the iBeacon's minor values).

HMD 150 embodies an apparatus that receives an ID signal from a Radio Emitting Object 160 such as said Universally Unique Identifier (UUID). As described in FIG. 1, HMD 150 may integrate one antenna or a plurality of antennas including Front Dipole Antenna 157, Right Dipole Antenna 158, and Left Dipole Antenna 159, as well as additional resources such as a Processor Section 155 and a Memory Section 156. Examples of processing resources may include, but are not limited to, those as reportedly incorporated into Google Glass, such as ARM Cortex-A9 MP Core SMP general-purpose cores as well as graphics processing cores such as PowerVR GX540. Memory resources may include volatile and non-volatile storage components, such as RAM, ROM, EEPROM, flash memory, or other storage technology. A person of ordinary skill in the art would understand that a Processor Section 155 and Memory Section 156 might be fixed or removable. In the latter case, the exterior or interior paneling of an HMD 150 may be moved in such a way that facilitates the swapping in and out of processing and memory resources. Furthermore, an HMD 150 may include a Display 154 that acts as the outputting mechanism for displaying information associated with said received ID signal. In one implementation of the present invention, HMD 150 displays AR indicia based on the received ID signal, including directional guidance information within the user's field of view.

The transmitted ID signal may carry ID information about a Radio Emitting Object 160 to an HMD 150. ID information corresponding to a Radio Emitting Object 160 can be represented by a discrete number of bits. In a possible implementation, ID information can be used, by means of a lookup table or other relational database, to link the ID of a Radio Emitting Object 160 with corresponding AR indicia.

The person skilled in the art will understand that a look up table is a simplified example of a database wherein the associations between values and data, e.g., ID information and the augmented reality (AR) indicia are usually fixed. Lookup tables can be either static or can be dynamically updated (aperiodically or continuously). In more complex implementations, these associations or information do not need to be fixed but rather can be dynamically updated according to automated real time data, user inputs, or service provider inputs just to provide a few examples. The term database may encompass a very broad range of simple associations (such as lookup tables) or more complex relational databases that may tie together either static or dynamic data from many different sources e.g., a users' input, service providers' input, an ambient data input, user profiles', et cetera. In many examples, the term "lookup table" is used as a simplification but the person skilled in the art will understand that it can be substituted with the term "database" of which a lookup table can be a subset and a particular implementation.

The profile of a Radio Emitting Object 160 (i.e. all the information that is associated with the transmitted ID) may provide additional information about a Radio Emitting Object 160 (or the person, or the widget, or good associated it). For example, a profile of a Radio Emitting Object 160 may encompass a whole range of data pertaining to one or more stored Radio Emitting Object IDs, including, but not limited to one or more of the following types: ownership data, location data, transaction data, hierarchal data, relational data, instructional data, social data, and authentication data and the kind of visual information that will be displayed on the visor of HMD 150. In one simplified implementation, the ID received from a Radio Emitting Object 160 is compared with information stored and associated with said ID by way of a lookup table.

In one implementation, the lookup table contains IDs and information that are directly associated with HMD 150. This means that whoever is wearing said HMD 150 hardware would receive the same information. In a supermarket, for example, customers may wear HMDs 150 that are owned by the store, such that all the information that each customer would receive would be the same (e.g. each customer who browses the dairy aisle will receive the same $1 off indication for the store-brand yogurt).

In another implementation, HMD 150 may be associated to a user profile via a login procedure. In this case, the information displayed by HMD 150 may change according to who is wearing sad HMD 150 apparatus. Moreover, said user profile may include settings and conditions information designed to specify not only what types of AR indicia are to be represented by HMD 150 user's display, but also which IDs are to be processed. In this exemplary embodiment, for example, a user profile may specify the membership of user A to a dating application. Because of algorithms and data that are stored on Remote Server 500 of FIG. 5, HMD 150 may selectively display information only to certain users. In this implementation, a database table may have multiple entries where 1) received IDs 2) AR indicia and 3) User Profile (e.g. user's specific permissions, preferences and authorizations) are cross-referenced. In this implementation, the same received ID may display different AR indicia for different users.

The person skilled in the art will understand that there are different implementations about where such lookup tables or databases can be stored. A few exemplary implementations follow.

In one implementation, a received ID signal by the HMD 150 may be cross-referenced in a lookup table or other relational database stored in a Memory Section 156 on the HMD 150.

Figure 5:
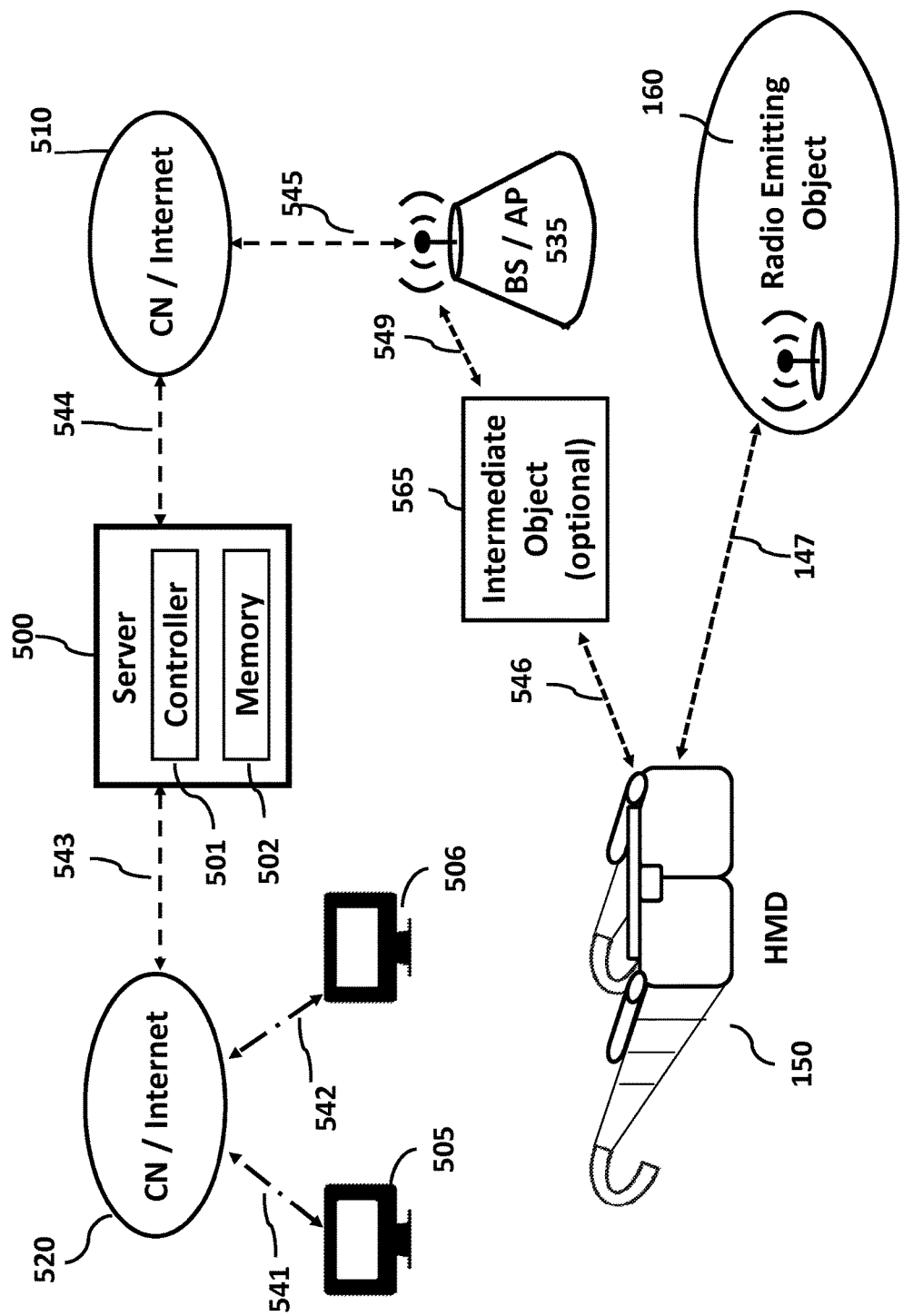
FIG. 5 provides an example of a system-level representation of the present invention, in which additional intermediate objects, communication paths, and remote servers may be utilized.

In another implementation, said lookup table, pairing received IDs and information associated with said ID, may be stored on Remote Server 500 or Server 530 of FIG. 5.

In other embodiments described with reference to other figures, multiple databases can be used and stored on both said HMD 150 and a plurality of servers and can be queried according to hierarchical rules.

According to the embodiment shown in FIG. 1, both a lookup table and a processing algorithm can be stored in a Memory Section 156 of the HMD 150. If the received ID is cross-referenced successfully within the lookup table, additional profile information may be accessed prior to outputting AR indicia to a Display 154 of the HMD 150.

In another implementation, HMD 150 apparatus may first attempt to pair the received ID on a first lookup table stored in Memory Section 156. If unsuccessful, it may send a query via a wireless link and scan for entries on additional lookup tables stored on a Remote Server 500, as shown in FIG. 5. According to this embodiment, the most common AR indicia or IDs can be processed locally within the HMD 150, while less common IDs or AR indicia will require processing within the cloud (remotely located from HMD 150). In one implementation, a hierarchical system may exist wherein hierarchical lookup tables can be queried by the system.

In another implementation, users may be classified into different tiers and only users with certain credentials may query certain lookup tables.

In other implementations, the most common associations can be dynamically and locally stored on the HMD 150 apparatus using a learning algorithm. For example, if certain IDs are recurring, data associated to those IDs can be locally stored on the HMD 150 for quick retrieval.

According to an example embodiment, in a supply chain environment context, a Radio Emitting Object 160 in the form of a shipped package, may be associated with information. In this example, once the ID of the shipped package is cross-matched to an entry in the lookup table, other information such as item name, serial number, SKU number, order number, destination address, among other classifying information data types and setting/configuration parameters, may be accessed, processed, and displayed within Display 154 of HMD 150.

The person skilled in the art will understand that "AR indicia" is a term that can be used to define different classes of visual representations. In certain embodiments it can be, e.g., an icon. In another, it can be a readable message. In another embodiment, AR indicia may vary according to certain parameters such as the distance from Radio Emitting Object 160 that is causing the AR indicia to be represented or the stability with which user is keeping Radio Emitting Object 160 within the visual field. The amount of time that said Radio Emitting Object is kept within the visual field may trigger different hierarchical levels of information associated to said Radio Emitting Object 160.

In another embodiment, and similar to the way a operates a mobile application on his or her smart phone, AR-specific applications can be used in connection with an HMD 150 (regardless if the information is processed and stored at the HMD 150 or a remote server). Here, AR-based tourist applications, shipping applications, retail applications, advertising applications, sporting event applications, dating applications, and so forth, may all pull data from the HMD user's profile before outputting relevant AR indicia to an HMD user. Moreover, each received Radio Emitting Object ID by the HMD 150 can be cross-referenced with multiple lookup tables associated with a plurality of applications running on HMD 150. If the received Radio Emitting Object ID is present among at least one of said lookup tables, then AR indicia can be relayed to the user and represented via HMD 150.

The Wireless Communication Link 147 between the HMD 150 and a Radio Emitting Object 160 may cover a wide frequency range, including but not limited to 900 MHz to 5.80 GHz bands. In a preferred embodiment, the system conducts communication over unlicensed Industrial, Scientific, and Medical (ISM) bands. For example, the HMD 150 may operate in the 2.300 to 2.310 GHz range or the 2.390 to 2.450 GHz range, as these bands are currently unlicensed within the United States. According to the implementation set forth in FIG. 1, HMD 150 and a Radio Emitting Object 160 may represent the primary system level components required. Signals from a Radio Emitting Object 160 are transmitted to the HMD 150 over Wireless Communication Link 147, such that the data therein can be stored and/or processed locally, ultimately allowing for AR indicia to be displayed within the user's HMD field of view via Display 154. In this implementation, no external servers or communication means are required to implement this embodiment of the invention, as the at least one lookup table or database is stored on the HMD 150.

Figure 2:
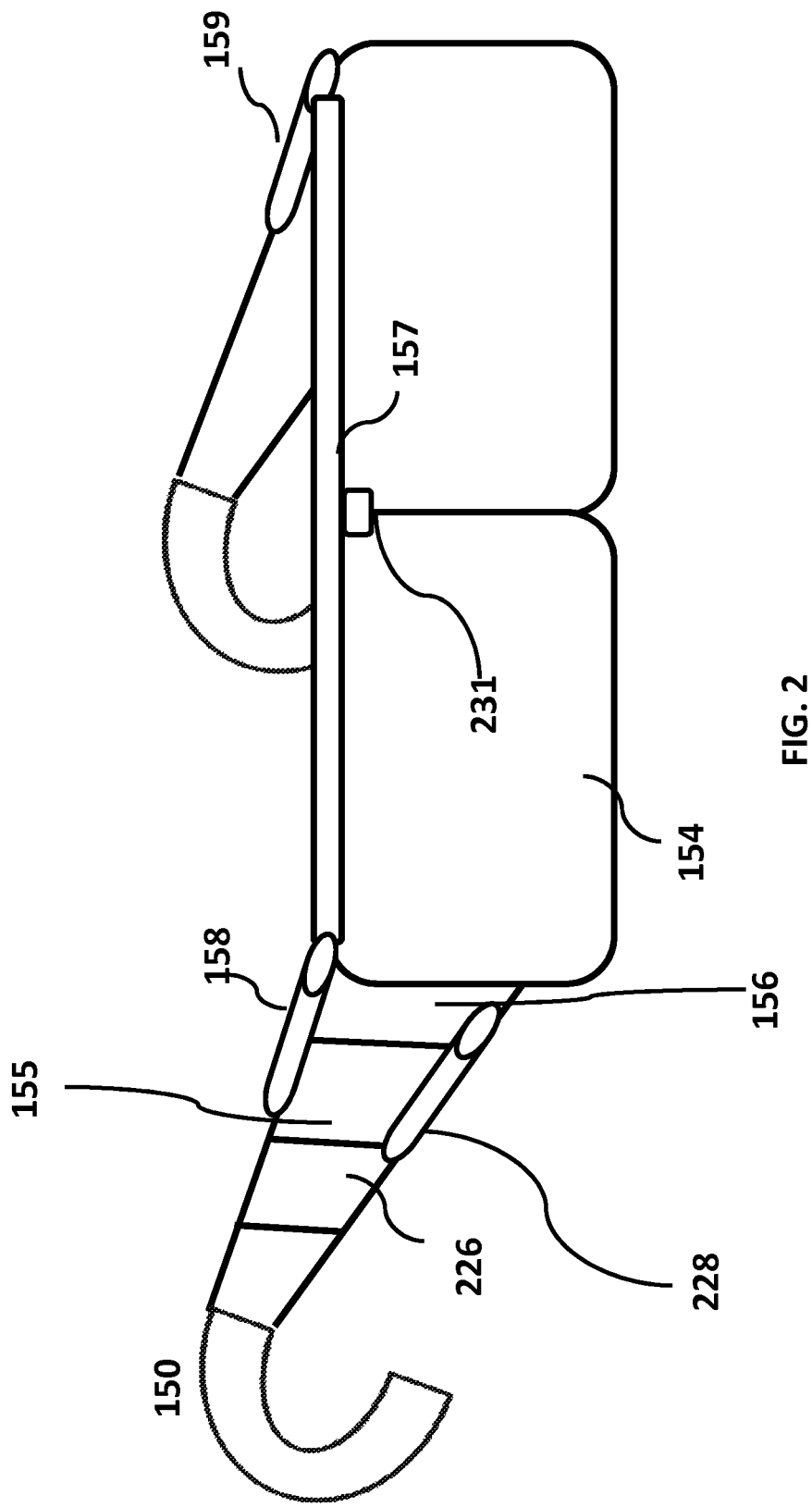
FIGS. 2 and 3 are representative of exemplary embodiments of an HMD utilizing different antenna structures and arrangements.

FIG. 2 describes a possible implementation of an HMD 150 based on geometry, wherein said geometry is used to determine the direction of arrival of the electromagnetic (EM) source of Radio Emitting Object 160. In the first example, at least three linear dipole antennas are embedded within the frame or affixed to the outside surface of the HMD 150, where each antenna is capable of receiving locally transmitted EM signals.

Dipoles have a gain pattern, shaped like a toroid (doughnut) symmetrical about the axis of the dipole. The gain is the maximum at right angles to the dipole, dropping off to a minimum value on the antenna's axis. The theoretical maximum gain of a Hertzian dipole is 10 log 1.5 or 1.76 dBi. The maximum theoretical gain of a half-wave dipole is 10 log 1.64 or 2.15 dBi. The most common form is the half-wave dipole, in which each of the two rod elements is approximately ¼ wavelength long, so the whole antenna is a half-wavelength long.

As shown, a Front Dipole Antenna 157 can be embedded in the front portion of the HMD 150, a Right Dipole Antenna 158 may be embedded within or integrated along the right temple portion of the HMD 150, and a Left Dipole Antenna 159 may be embedded within or integrated along the left temple portion of the HMD 150. Each antenna on the HMD 150 can receive a broadcasted ID signal from a Radio Emitting Object 160. In this first implementation, the HMD 150 may integrate other components as previously described, including a Processor Section 155 and a Memory Section 156. An Auxiliary Section 226 may integrate input, processing, additional storage, output components, or additional antennas elements.

In some implementations, Auxiliary Section 226 may contain an RF-ID interrogator to trigger the emission of a radio wave from Radio Emitting Object 160. Said interrogator can be directional or omnidirectional.

A person skilled in the art would recognize that any one or more input devices can be integrated within the Auxiliary Section 226, such as, but not limited to microphones (acoustic-sensing), thermometers (environmental-sensing), gyroscopes & GPS (position/velocity/acceleration-sensing), photodiodes (optical-sensing), barometers (pressure-sensing), infrared (thermal-sensing), digital or magnetic compass, and may be used singularly, or in combination with other sensors. Additional processing components such as a dedicated graphics processing cores or output components such as speakers can be integrated within the frame of the HMD 150. While the implementation of FIG. 2 reveals three sections which may house these individual components separately across a Processor Section 155, Memory Section 156, and Auxiliary Section 226, it should be understood the input, memory, processor, communication, and output components may be mounted or embedded in any part of the HMD 150. While these locations can include the left, right, and front portions of the HMD 150, in one scenario, these components may be specifically connected by way of an attached external unit.

Figure 4:
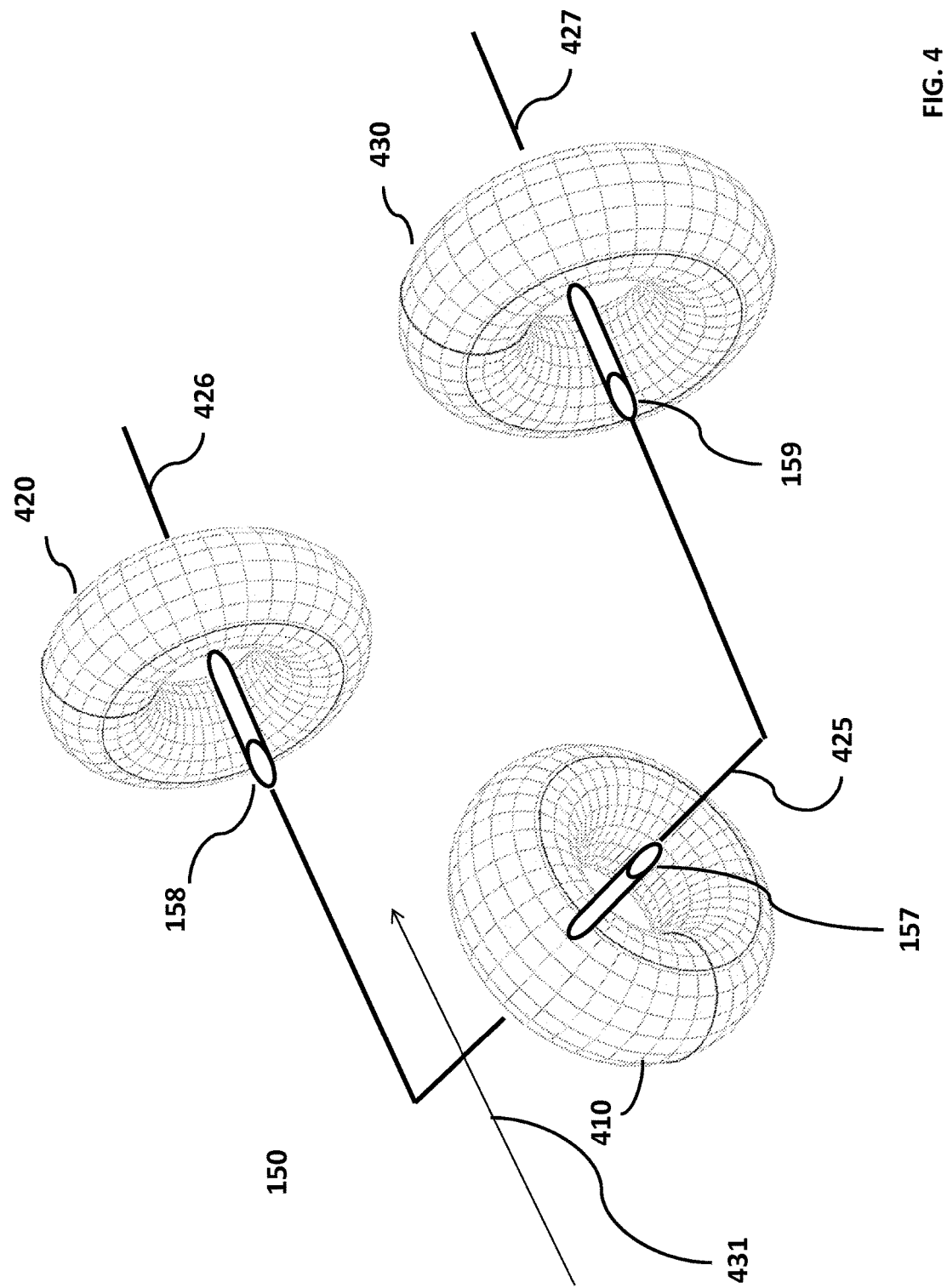
FIG. 4 depicts an embodiment of how reception patterns for a three dipoles HMD.

An additional explanation of this embodiment will follow with reference to FIG. 4 where the radiation, or reception, patterns associated with Front Dipole Antenna 157, Right Dipole Antenna 158 and Left Dipole Antenna 159 will be represented and discussed. A person skilled in the art will understand that if a user wearing an HMD 150 is pointing Right Dipole Antenna 158 and Left Dipole Antenna 159 toward the radio emitting source, the gain of those dipoles will be at a minimum while the gain of Front Dipole Antenna 157 will be at a maximum.

In one implementation, the signal strengths of the received electromagnetic radiation at each antenna and their derivative function (associated with the variation of the spatial orientation of said HMD 150 that can be tracked by a gyroscope) can be used as an input for an algorithm stored on a memory of HMD 150 to determine "where, how and when" to produce an output for AR indicia to be represented by Display 154.

The person skilled in the art will understand that HMD 150 can use different methods to guide the positioning of the AR indicia. Signal strength based methods are just one example.

A three-antenna configuration is one of the many possible implementations. Additional antennas (e.g. dipoles) can be added to refine the AR indicia positioning on Display 154. For example, a Secondary Right Dipole Antenna 228 can be added having a slightly different angle in respect to Right Dipole Antenna 158 to fine tune and guide the positioning of the AR indicia on Display 154. Said Secondary Right Dipole Antenna 228 can be contained on the same plane as Right Dipole Antenna 158 or not. The person skilled in the art will understand that more antennas can be positioned at different angles or on different planes in the same way as Right Dipole Antenna 158 and Secondary Right Dipole Antenna 228 to guide the fine positioning of the AR indicia.

In addition, with reference to FIG. 2, the person skilled in the art will understand that, if the shielding of a user's head of Front Dipole Antenna 157 is not considered, there could be a 180-degree problem. This means that both for Radio Emitting Objects 160 exactly in front and exactly in the back of an HMD 150, Right Dipole Antenna 158 and Left Dipole Antenna 159 will exhibit minimum gain patterns while Front Dipole Antenna 157 will exhibit a maximum gain pattern.

To solve this ambiguity, a Fractal Antenna 231 can be used. In one implementation, Fractal Antenna 231 is a directional antenna whose maximum gain is toward the field of view and it is minimal in the opposite direction. This can be achieved by shielding the back of Fractal Antenna 231 with radiation absorbing material. In other implementations, the ambiguity can be resolved using Bayesian based algorithms and the shielding of the head of a user of HMD 150.

Figure 3:
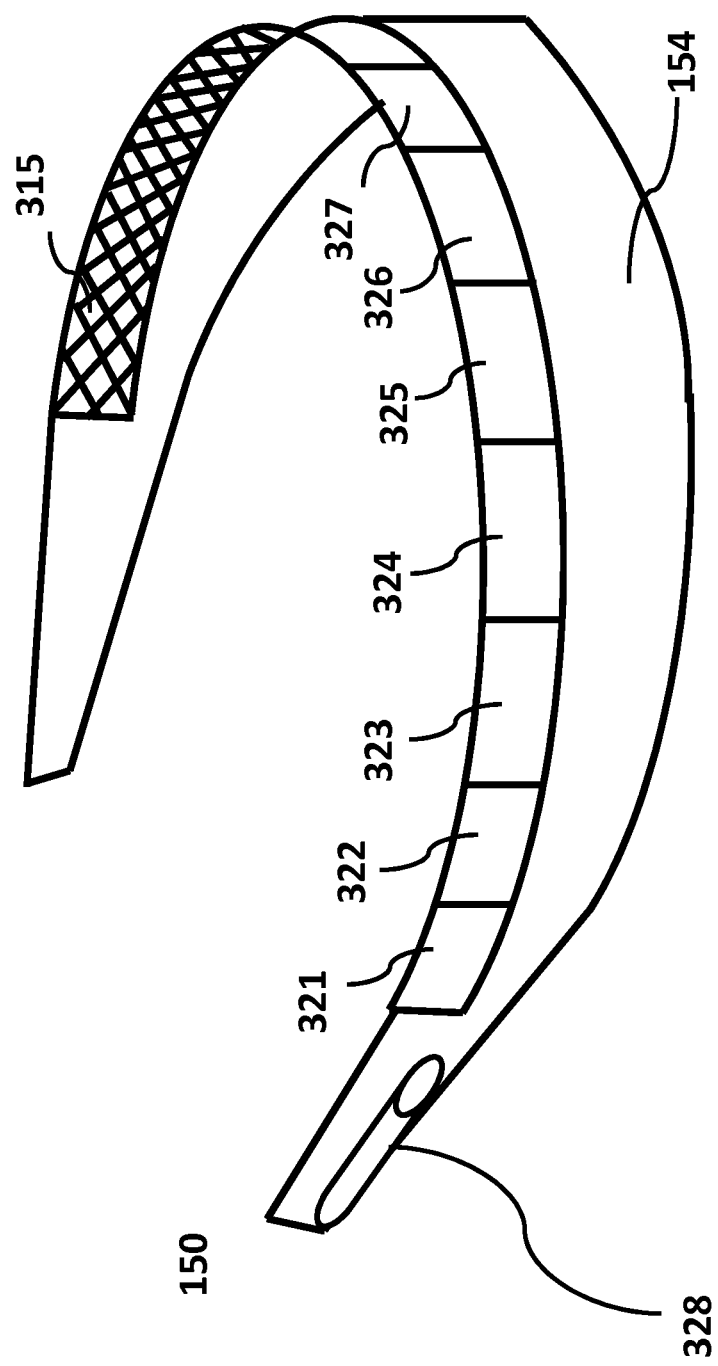

FIG. 3 describes another implementation where a plurality of directional Fractal Antennas 321-327 can be mounted onto HMD 150. By arranging an array of fractal and directional antennas across the frame of HMD 150, HMD 150 may observe different signal quality across a wider band of frequencies. Similarly stated, based on the signal strengths received by each of the fractal antennas per ID signal received, a higher resolution of the location of the Radio Emitting Object 160 can be achieved and ultimately outputted through Display 154. The Fractal Antennas 321-327 can be placed anywhere on, or along, the frame of the HMD 150, which as illustrated, can be represented in the form of a curved HMD structure. Accordingly, the fractal antenna iterations can span one or more of the frontal, left temple, or right temple portions of the HMD 150. These iterations may be on the top or bottom edges of the HMD 150, or embedded anywhere within the frame. The one or more mounted Fractal Antennas 321-327 may be contiguously or non-contiguously arranged across the frontal frame, right temple portion of the HMD 150, or left temple portion of the HMD 150. As one of ordinary skill in the art would understand, the fractal antenna patterns may be modified to accommodate various preferred frequency ranges. In one embodiment, the one or more Fractal Antennas 321-327 are about 3 centimeters, and designed to receive ¼ wavelength signals in the e 2.4-2.5 GHz band.

As shown in FIG. 3, the HMD 150 may employ an Antenna Barrier 315 that is situated between the user's head and the situated antenna elements. A person of ordinary skill in the art would recognize an Antenna Barrier 315 might rely on conductive shielding, wherein said Antenna Barrier 315 may be comprised of sheet metal, metal foam, or a metal screen. Similarly, an Antenna Barrier 315 may also be coated with a metallic material, such as copper or nickel, effectively creating a shielding layer. Herein, the electromagnetic shielding relies on induction in order to dampen or negate current. In another embodiment, an Antenna Barrier 315 may rely on passive techniques via the utility of absorbing material (e.g. aluminum iron-oxide). In both active and passive methodologies, an Antenna Barrier 315 can help ensure that only electromagnetic radiation arriving from frontal sections of HMD 150 will be considered in determining the position of a Radio Emitting Object 160, the direction of arrival of the electromagnetic wave, and the associated visualization of AR indicia.

In one implementation, an Auxiliary Dipole Antenna 328 can be added to guide the positioning of AR indicia on Display 154, as it will be explained in detail with reference to FIG. 4. The HMD 150 may integrate an Auxiliary Dipole Antenna 328, in conjunction with the Fractal Antennas 321-327, to receive ID signals from a nearby Radio Emitting Object 160. By using one or more dipole antennas (e.g. Auxiliary Dipole Antenna 328) in this scenario, the vertical orientation, or altitude, of a Radio Emitting Object 160 can be more accurately determined. Extending this example, the system may also include two dipole antennas that are skewed in respect to the axis of HMD 150 frame and use Bayesian statistics and techniques to determine the direction of arrival, and traveled distance of the radiation (even if, for example, distance can be assessed also via standardized functionalities in an iBeacon system).

FIG. 4 describes an implementation of how an HMD 150 may use electromagnetic radiation reception patterns of three antennas to estimate the position of a nearby Radio Emitting Object 160. This implementation has been already briefly discussed with reference to FIG. 2. For the purposes of simplifying an inventive concept in the present application, the Front Frame 425, Right Temple Frame 426, and Left Temple Frame 427 are represented by three straight lines. In this embodiment, three dipole antennas are mounted to the HMD 150. Dipole antennas, including Front Dipole Antenna 157, Right Dipole Antenna 158, and Left Dipole Antenna 159 can be mounted to each of the HMD's Front Frame 425, Right Temple Frame 426, and Left Temple Frame 427, respectively, such that each of these aforementioned dipole antennas 157-159 have an equal ¼ wavelength operating at a 2.4 GHz frequency. The person skilled in the art will understand that one-half wavelength and full wavelength antennas can also be used because the 3D patterns for the 1-wavelength dipole antenna, the quarter-wave antenna, and half-wave dipole antenna are similar.

During operation, when a nearby Radio Emitting Object 160 periodically broadcasts its ID signal, each dipole antenna mounted onto the HMD 150 will receive the same broadcasted ID signal differently because of the different gain levels received by each of the mounted antennas. It should be noted that each dipole antenna has an associated Reception Pattern 410, 420, and 430 based on its physical characteristics such as size, shape, and orientation. Because of each dipole antenna's characteristics and respective physical locations and orientation, each dipole antenna will receive a different signal strength, different phase, and a different time of arrival (TOA) from any broadcast transmitted from a local Radio Emitting Object 160.

As can be observed by the example shown in FIG. 4, assuming that a user of HMD 150 is staring at the Radio Emitting Object 160 and Electromagnetic Wave 431 is parallel to Right Temple Frame 426 and Left Temple Frame 427 and perpendicular to Front Frame 425, because of the orientation of frontal electromagnetic Reception Pattern 410 and the gain of Front Dipole Antenna 157, said Front Dipole Antenna 157 will collect the maximum amount of electromagnetic energy.

Conversely, because of left and right electromagnetic Reception Patterns 420 and 430, Right Dipole Antenna 158 and Left Dipole Antenna 159 will collect the minimum amount of electromagnetic energy emitted by Radio Emitting Object 160. In other words, based on the received signal strength levels of the Radio Emitting Object signal by each of the three antennas, the originating position of the Radio Emitting Object 160 can be probabilistically calculated. This implementation is based on signal strength measurements.

In another example, an ID signal may be received by an HMD 150 from a Radio Emitting Object 160 associated with an object from a location 10 feet way, at a degree of 45 degrees to the left of the user. In this case, a Front Dipole Antenna 157 and Right Dipole Antenna 158 respectively, will receive signals with approximately similar signal strength levels, though with different phases and different times of arrival. Additionally, the Right Dipole Antenna 158, Left Dipole Antenna 159, will not only observe a different phase and time of arrival, but it will receive lower signal strength since the Left Dipole Antenna 159 is physically the farthest away from the Radio Emitting Object 160. Through this process of using more than one antenna, the location and ID information of a Radio Emitting Object 160 can be more accurately tracked with higher resolution.

The above examples, where the processing can be performed at HMD 150, may rely on using Bayesian statistics to determine the direction of arrival and traveled distance of the radiation. If the signal strength of the signal associated with the two side antennas is minimal and the signal strength of the signal received by the Front Dipole Antenna 157 is at a maximum, it signifies that the HMD 150 is aligned with the direction of arrival of the electromagnetic radiation.

In one possible implementation where the Radio Emitting Object 160 is an iBeacon, the HMD processing core may receive a distance data (HMD—Radio Emitting Object) and adjust the positioning of the augmented reality indicia accordingly. For example, by knowing the distance of the object the HMD may estimate the signal strength that should be received by Left Dipole Antenna 159 and Right Dipole Antenna 158 when user is staring at a Radio Emitting Object 160 and correct for any parallax error.

The plurality of antennas can capture and subsequently process, via the HMD's processing core by way of triangulation methodologies, the signal strength, time of arrival, and signal phase in order to estimate the originating position of the Radio Emitting Object 160. A person with ordinary skill in the art would recognize that more than three antennas can be mounted in an array configuration on the HMD 150 in order to increase the resolution and accuracy of an emitting Radio Emitting Object 160. In addition, the reception patterns of the antennas can be modified by the usage of radio adsorbing or shielding material.

In one implementation, one aspect of the invention resolves the problem in which a Radio Emitting Object 160 is positioned directly behind the HMD user (180 degrees from the direction the HMD user is aiming at). In this scenario, per the arrangement of FIG. 4's HMD structure, one might expect the Right Dipole Antenna 158 and Left Dipole Antenna 159 to exhibit minimum gain associated to a nearby, transmitted ID signal (as both of these dipole antennas are positioned perpendicularly to the radiated ID signal). In addition, despite the human head diminishing the strength of the signal originating directly behind the user, the Front Dipole Antenna 157 may still nonetheless register a received electromagnetic radiation source higher than the side dipole antennas (i.e. Right Dipole Antenna 158 and Left Dipole Antenna 159). In this case, with only one effective electromagnetic radiation received by Front Dipole Antenna 157 (and low electromagnetic radiation received by Right Dipole Antenna 158 and Left Dipole Antenna 159), the user may not know if the Radio Emitting Object 160 is in front or directly behind the Front Dipole Antenna 157.

One way to address the above problem is to integrate a fractal antenna at any place along the frontal frame of HMD 150. By integrating a fractal antenna anywhere along the frontal frame facing outward, i.e. in the direction in front of the user, a Processor Section 155 integrated into HMD 150 can resolve the 180 degrees ambiguity. In this scenario, if a Radio Emitting Object 160 was located 180 degrees behind the user, the fractal antenna will not pick up an emission from said Radio Emitting Object 160 if said Fractal Antenna 231 in FIG. 2 has only a frontal gain pattern (because the back can be shielded by radiation absorbing material).

Another way to address a 180-degree problem is to set up the side dipole antennas at angles that are not exactly perpendicular to a Front Dipole Antenna 157. In this case, the Right Dipole Antenna 158 and Left Dipole Antenna 159 may now receive radiation emissions and corresponding TOA measurements since they are no longer perpendicularly oriented from a radio-frequency perspective to the Radio Emitting Object 160. By taking into account the electromagnetic radiation emitted from the front frame antenna, or Front Dipole Antenna 157, a processing algorithm can identify if the Radio Emitting Object 160 is definitively in front or behind HMD 150 user via triangulation techniques. As discussed with reference to FIG. 2, additional dipole antennas can be integrated into the frame, such as Secondary Right Dipole Antenna 228. These antennas can be used to incorporate additional measurements that may be used by the positioning algorithm to calculate a more precise location and distance information of nearby Radio Emitting Objects 160.

Alternatively, the system may use historically captured ID signals in order to identify if Radio Emitting Objects 160 of interest are directly in front or directly behind the HMD user by using a compass module or a gyroscope module or a positioning system module, or a combination thereof of said modules. Specifically, HMD 150 may take into account the signal strengths and times of arrival of previously captured Radio Emitting Object signals from each of the HMD antennas.

By way of example, if a Radio Emitting Object 160 was determined to be at an angle of 175 degrees from HMD 150 direct visual field at time T, this information may be temporarily stored in the Memory Section 156 of the HMD 150. Accordingly, at time T+1, when both the Right Dipole Antenna 158 and Left Dipole Antenna 159 register no or minimal signal (based upon their perpendicular orientations) and the frontal frame may still register a radiation pattern, the system may now assume, based on the recent history, that the Radio Emitting Object 160 of interest is located at 180 degrees as opposed to 0 degrees. In this case, HMD 150 may also integrate a gyroscope or a compass to aid this functionality.

A person of ordinary skill in the art would recognize that radio frequency propagation is affected by diffraction, scattering, refraction, reflection, and interference. The same person would also understand that there are a number of challenges that exist with multipath fading, time delay, and Doppler Effect situations, all of which may affect the signal strength, timing, and phase and angles of the emitted ID's signal arrival. By using two or more antennas in a spatial diversity setting, the invention can better handle the effects of multipath and time delay. For example, if one of the three or more dipole antennas resides in a null spot, where one or more reflected signals have destructively interfered with the main emitted ID signal, this antenna's received radio signal may be taken into account or discarded by the HMD processor. In another case, a Doppler Effect may be identified by way of a Doppler velocimetry/anemometry mechanism in the HMD 150. Here, regardless if the HMD 150 and/or Radio Emitting Object 160 were physical moving in relation to one another, the Doppler Effect, or shift in frequency, can be calculated and processed when determining relative direction.

The person skilled in the art will understand that many methods, based on different techniques, exist to determine the direction of arrival of an electromagnetic wave. Some of these methods are described, e.g., in books such as "Introduction to Direction-of-Arrival Estimation" by Zhizhang Chen, Gopal Gokeda, Yiqiang Yu (ISBN 13:978-1-59693-089-6), or "Classical and Modern Direction-of-Arrival Estimation" by Engin Tuncer and Benjamin Friedlander (ISBN 13: 978-0-12-374524-8) that are incorporated in this application in their entirety. One of the methods described in this application is based on a comparison of different signal strengths received at different antennas. Other techniques can be employed like phase arrays, difference of time of arrival, phase differences et cetera. All of these techniques are within the scope of this disclosure.

FIG. 5 describes an embodiment in which the system integrates the storage, processing, and interconnectivity advantages afforded by cloud-based resources and other communication links. As shown, an HMD 150 may wirelessly communicate with a Base Station/Access Point 535, hereinafter BS/AP 535, in order to leverage the storage, processing, and communication capabilities of external system components. HMD 150 can wirelessly connect to the BS/AP 535 by means of one of the many available radio access wireless standards singularly via Data Link 546 or via a combination of data links such as Data Link 546 and Data Link 549. One skilled in the art would understand that ZigBee, Wi-Fi, Nike+, Bluetooth, 3G and 4G and NFC/RFID are representative, but not exhaustive, communication protocols that could directly or indirectly be used to communicate with BS/AP 535.

As shown in FIG. 5, an Intermediate Object 565 can be located between HMD 150 and the Internet Cloud, hereinafter referred to as CN/Internet 510, and Remote Server 500. A person of ordinary skill in the art would understand that the Intermediate Object 565 can be embodied in the form of a smart phone, tablet, smart watch, or any other wearable computing device, located in proximity to HMD 150. HMD 150 may connect using any short range communication protocol across the wireless Data Link 546 to an Intermediate Object 565, by way of communication protocols such as Bluetooth, ZigBee, Wi-Fi, or Nike+. In this case, HMD 150 may not require memory or processing resources; rather, an Intermediate Object 565 may contain the resources to perform the necessary processing and storing operations prior to sending the AR indicia to HMD 150. Consequently, in this case, HMD 150 may operate simply like a dumb output terminal while all the processing functionalities (as well as the long range connectivity functionalities via Data link 549) may be taken care by an Intermediate Object 565.

Alternatively, HMD 150 can be directly connected to CN/Internet 510 by way of BS/AP 535, such that the HMD 150 user does not require a physically proximate Intermediate Object 565 to perform processing and storing.

One skilled in the art would understand that HMD 150 may access the functionalities of Remote Server 500 by way of Data Link 544 and Data Link 545. The person skilled in the art will understand that links, core networks and Internet clouds depicted in FIG. 5 are proxies and representations for a possibly non-homogeneous variety of different standards, technologies and hardware in charge of transporting data from and to different objects such as Remote Server 500, Computer 505, HMD 150, and Radio Emitting Object 160.

In one exemplary implementation, Computer 505 may represent an I/O interface to be utilized by an HMD user, such that an HMD user may store his or her profile information and settings across CN/Internet 520 and onto Remote Server 500, and specifically in Memory 502.

In this example, a separate computer, or Computer 506, may represent an I/O interface to be used by an entity other than the HMD end user, such that a third party entity may asynchronously or dynamically modify profile information, settings, and permissions of the HMD user. For example, a third party entity using Computer 506 may manually (or automatically upon the occurrence of a payment, for example) authorize the user of HMD 150 to consult certain lookup tables that are stored on a server and receive certain information associated to a certain Radio Emitting Object 160. In another example, a parent may adjust the settings of her child's HMD 150 via Computer 506 for the goal of only permitting the display of certain Radio Emitting Object 160 emissions (e.g. nearest police officer) or any object associated with users of his or her age.

Whether or not the processing and storing is carried out at the HMD 150, at the Intermediate Object 565, or at a Remote Server 500, an association between a received ID from Radio Emitting Object 160 and the AR indicia may trigger a visual representation of said AR indicia overlapping with the direction of arrival of an electromagnetic wave. As explained with reference to previous figures, the association can be dynamic (i.e. it can vary in time according to various parameters and inputs) and user based (i.e. it can vary according to which user is receiving the ID).

Computers 505 and 506 can be desktop or mobile based systems that can be used to configure and manage a user's HMD 150 communication with a Radio Emitting Object 160. For example, an HMD user's owner may enter profile information via Computer 505 and a third party entity may be authorized to enter profile information for the same HMD owner, e.g. through Computer 506 or another computer, because he is running a service associated with HMD 150.

A user profile associated with an HMD 150 may incorporate information such as AR settings and filters, user information, hierarchy position, authentication information, settings and authorizations. This data can be entered or updated either manually or automatically via Computers 505 and 506 and by way of Data Links 541 and 542, respectively by users, entities such as service providers, authorities or information providers. This information may be stored in a database (e.g. relational database) and modified when appropriate. Said information may be transmitted via the CN/Internet 520 network by way of Data Link 543 to a Remote Server 500. Said information may be stored in Memory 502 and processed via Controller 501 within the Remote Server 500. Said information, or the proceedings of said information can be communicated via Data Link 544, CN/Internet 510, Data Link 545, BS/AP 535, Data Link 546, Data Link 549 (optional), and ultimately to HMD 150. Information may be transmitted along this path via periodic updates or in a real-time asynchronous manner, if needed. For example, the GPS information of an HMD user may be recorded through HMD 150 and automatically fed into a user's profile. For example, a user can be authorized to receive certain AR indicia only within a certain geofence.

Furthermore, multiple AR software applications may operate through HMD 150 simultaneously, or conversely, a single AR application may operate through HMD 150 at any given time. For the latter scenario, a priority order may be specified by the HMD user if a received Radio Emitting Object 160 is successfully cross-referenced to at least one of the user's HMD AR applications. For example, an HMD user may indicate that his AR application focused on networking with legal professionals takes precedence over his AR dating application. In a simple illustrative example, Bob may receive guidance Carol's professional information within his Display 154 rather than her marital status as one might expect in a dating application. The invention may incorporate both applications simultaneously as well. In both cases, the outputted guidance information, i.e. the direction and proximity to the received radio object-emitting signal [Carol], will be the same. However, the AR may be merged, de-duped, and presented within the Display 154 at different times.

Figure 6:
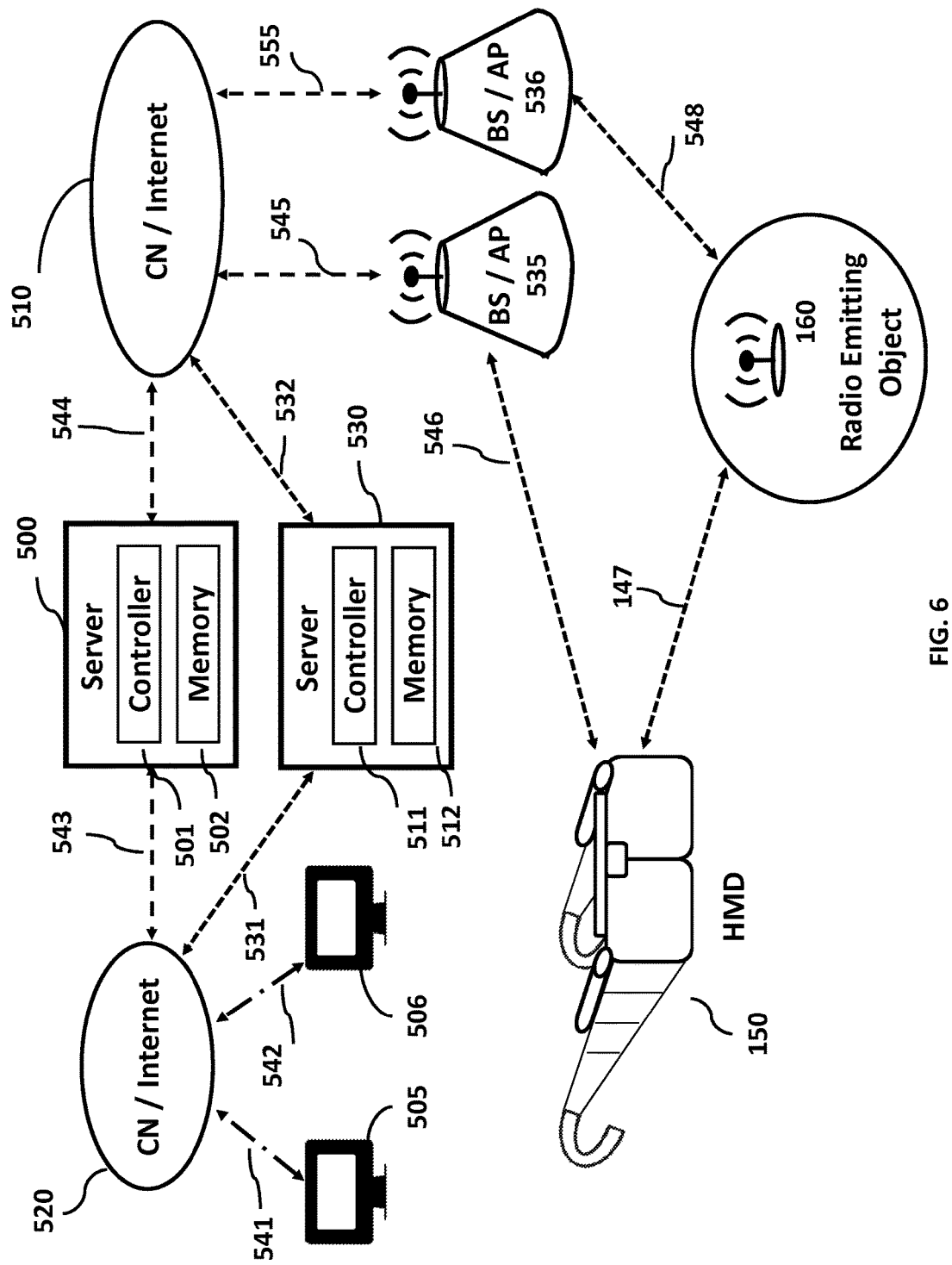
FIG. 6 provides an alternative system-level representation of the present invention.

FIG. 6 describes an embodiment in which a Radio Emitting Object 160 maintains ID information and corresponding profile information, similarly to the way each HMD user has an ID and associated profile. Each ID attached to a Radio Emitting Object 160 can also then correspond to a unique Radio Emitting Object profile, e.g. by way of a lookup table or other relational table. Attribute information can be stored within the profile of each Radio Emitting Object 160. In general, this attribute data may be different across various classes of Radio Emitting Objects 160. For example, a Radio Emitting Object 160 associated with a person may include the person's name, age, gender, relationship status, job title, location, and other attribute information. In a second example, a Radio Emitting Object profile associated with a package on a shipping pallet, may contain attributes such as product name, SKU#, sending party's name, future owner's name, shipping origin address, intermediate addresses, and final destination addresses. Across each profile, attribute information may include authorization details, such that only HMD users with the proper credentials can access the AR indicia associated with certain Radio Emitting Objects 160.

Computer 506 may also represent an I/O interface to be used by an entity who manages the profile information of one or more Radio Emitting Objects 160. As shown in FIG. 6, this profile information can be inputted through Computer 506, delivered over Data Link 542 to CN/Network 520, and transmitted to the Memory 512 of Server 530 across Data Link 531. Said information can be used to control the operation of the Radio Emitting Object 160 by way of Data Link 532, CN/Network 510, Data Link 555, BS/AP 536, and a Data Link 548.

A profile of a Radio Emitting Object 160 may also include transmission parameters that facilitate the operation of the radio emitting broadcasts. In its simplest form, the "when", "where", and "what" a Radio Emitting Object 160 transmits, may be managed within the profile of said Radio Emitting Object 160. Particularly, the transmission parameters of a Radio Emitting Object 160 may be programmed by an entity associated with the Radio Emitting Object 160 through Computer 506. The entity may be the owner of the Radio Emitting Object 160, or conversely, the entity may be the operator, supervisor or another third party associated with the Radio Emitting Object 160. In operation, an entity may input at Computer 506 through Data Link 542, to the cloud, the outbound signal parameters of a Radio Emitting Object's 160 transmitting antennas. Conversely, the transmission parameters of one or more Radio Emitting Objects 160 may be modified by another entity (e.g., law enforcement may dictate that certain Radio Emitting Objects 160 can only function in certain acceptable establishments or areas). Again, each Radio Emitting Object 160 may be broadcasting an ID that distinguishes itself from other Radio Emitting Objects 160. In some implementations, an entity may be able to vary the ID that is transmitted by Radio Emitting Object 160.

One emission parameter may include the timing of its broadcasted ID signals. In one embodiment, all the Radio Emitting Objects 160 within an environment may be programmed to be activated during a specified time interval. For example, the manager of a retail store may desire its Radio Emitting Objects 160 (associated, e.g., with products for sale) to only transmit during hours of operation (e.g. 9:00 AM to 5:30 PM). Moreover, the periodicity of the Radio Emitting Object 160 may be changed based on the agent's preference. In one example, a Radio Emitting Object 160 can be programmed to emit ID signals every 100 ms. In another example, one or more conditions may be used to activate or deactivate the transmission patterns of Radio Emitting Object 160. For example, besides entity specified timing parameters, sensor-based inputs may be fed dynamically or asynchronously to one or more profiles associated with the Radio Emitting Objects 160. Proximity, acoustic, and temperature sensors comprise a representative sample of input mechanisms that can be used to activate or deactivate the transmission of corresponding Radio Emitting Objects 160. In an example, if an infrared sensor located in a room of a furniture store senses a human body, the infrared sensor may dynamically update on a server, the transmission parameters of all the Radio Emitting Objects 160 within that room of the furniture store. Extending the previous example further, if two conditions are now met: 1) time of the day is between 9:00 AM to 5:30 PM range and 2) at least one patron is detected within in the local vicinity [as sensed by an infrared sensor], a Radio Emitting Object 160 can be activated within that furniture storeroom. One outcome of this embodiment is that energy may be conserved, as one or more Radio Emitting Objects 160 no longer have to emit periodic ID signals in an empty room.

Another parameter of Radio Emitting Object 160, stored within the profile associated with a Radio Emitting Object 160 on a server, may include information in regards to the direction in which emitted broadcast signals can be transmitted. According to an embodiment, broadcasted ID signals may be transmitted in a sectored or an omnidirectional manner. From a unidirectional perspective, the Radio Emitting Object 160 may always emit its broadcast signal across a single sector, i.e. covering a narrower range than a full 360 degrees. A simple example may be appropriate when a fixed Radio Emitting Object 160 is placed in the corner of a room. In this case, it may be more suitable only to broadcast ID signals across a sector covering 90 degrees, underscoring the fact that emitting ID signals in the direction of the remaining 270 degrees would be wasteful. Alternatively, the signal may be emitted in a more omnidirectional capacity. For example, the profile of a Radio Emitting Object 160 may indicate that it must transmit in six directions (up, down, left, right, front, back) in order to reach the maximum number of local users regardless of their angular position in relation to the Radio Emitting Object 160. Continuing this example, these broadcast signals can transmit consecutively across all six directions in a periodic fashion. Conversely, signals can be directed in more than one direction simultaneously in order to reduce the transmission interval in any given direction. Here, isotropic or omnidirectional antennas can be used in order to radiate equal power across one plane, and to radiate equal power in all directions, respectively.

It should be noted that other transmission parameters may specified within a profile of a Radio Emitting Object 160, besides timing and directional information. Radiated power levels, output frequencies, and modulation modes can also be dynamically configured. Server 530, may be used to dynamically adjust the database entries that can be stored, e.g., in Memory 512. For example, Server 530 may receive information that a person associated with Radio Emitting Object 160 is having is birthday. The AR indicia associated with said Radio Emitting Object 160 may reflect said occurrence so that people around said person associated with Radio Emitting Object 160 may wish "happy birthday."

Figure 7:
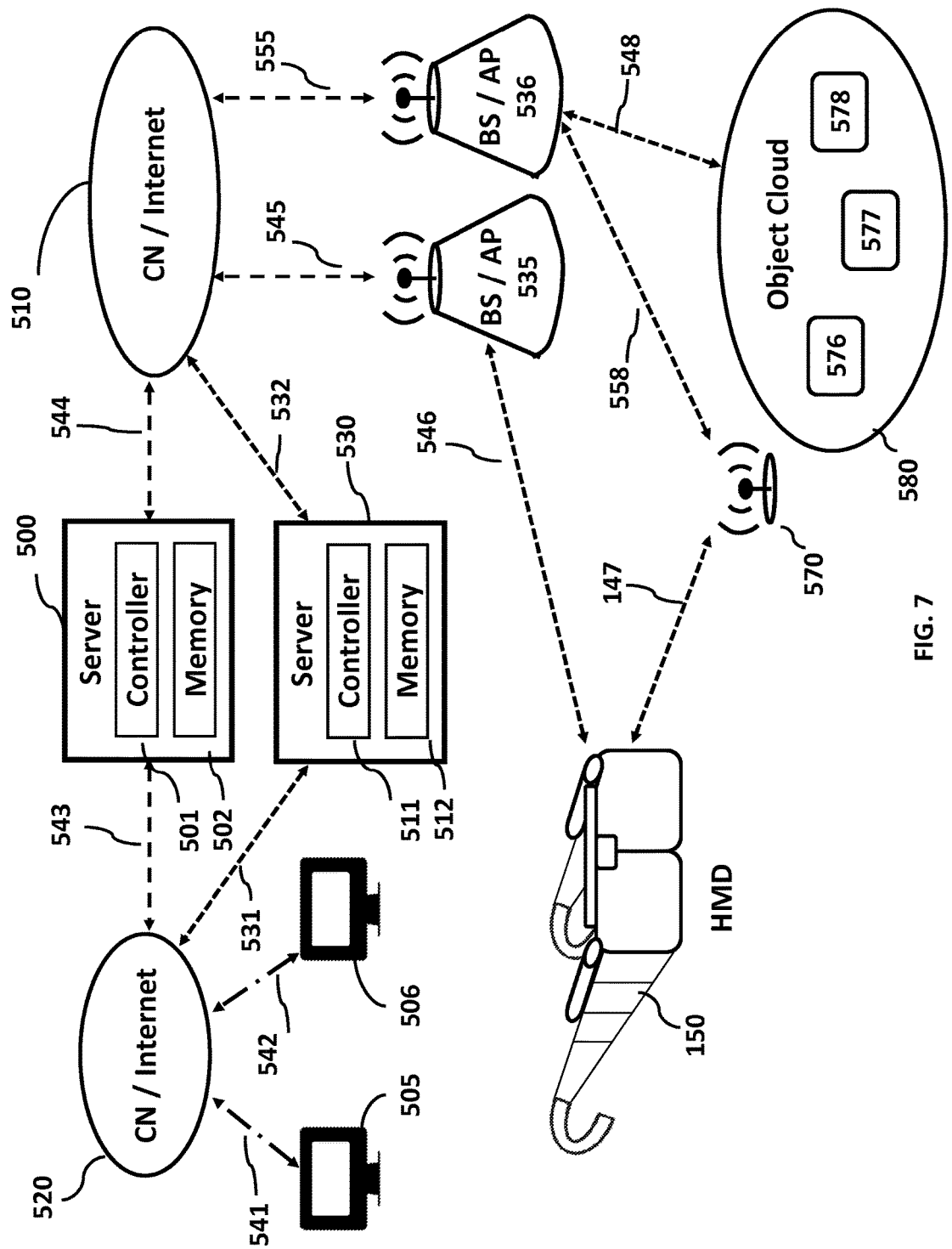
FIG. 7 illustrates a system-level representation of the invention where multiple objects are detected, synthesized, and transmitted to an HMD by a Master Radio Emitting Object in real-time.

FIG. 7 illustrates an embodiment of a system that enables synthesized information about objects or users to be transmitted to Server 530. This synthesized information can then be used, dynamically and in real-time, to update lookup tables that are stored on said Server 530 or other servers. A Master Radio Emitting Object 570 may summarize the information that is pertinent not of a single entity, item, or person, but a group of entities. In other words, the system may aggregate the profile information of an Object Cloud 580 within a given location, synthesize this information in the cloud, and ultimately broadcast this real-time synthesized information from a transmitter of a Master Radio Emitting Object 570. An Object Cloud 580 may comprise one or more Objects 576-578, in a localized area, where the localized area could represent a retail store, a warehouse, a restaurant, or the like.

Objects within an Object Cloud 580 may signify their presence within the Object Cloud 580 in a plurality of ways. For example, a user or object may be registered to an Object Cloud 580 via GPS (and specifically upon the determination of the user or object's location within an enclosed geofence area), wherein the user's or object's attribute information can be linked to said Object Cloud 580 by way of Memory 502. Another user may manually indicate via Computer 505 that he is physically located in a specific Object Cloud 580, wherein the user's or object's attribute information can be linked to said Object Cloud 580 by way of Memory 502.

The person skilled in the art will understand that objects may be proxies for users, patrons in an establishment, widgets, goods, an establishment as a restaurant or other.

Each of the objects in the Object Cloud 580 may communicate its "presence" by way of BS/AP 536, Data Link 555, and CN/Internet 510 in one of two ways: 1) directly via Data Link 548; and 2) indirectly, via a transmitting/receiving Master Radio Emitting Object 570 across Data Link 558. The "I am here" presence information may then be stored in the Memory 512 of Server 530 via Data Link 532. Particularly, the "I am here" presence information may be stored in one or more of the following records: 1) HMD user's personal ID profile, 2) A localized area based profile, that, as mentioned previously, could be a retail store, a warehouse, a restaurant or the like. Software algorithms can be used by Controller 511 to synthesize data derived from the presence information and profile information of the Radio Emitting Objects 160 within a localized area. The real-time synthesized data may then be delivered from BS/AP 536 to Master Radio Emitting Object 570 via Data Link 558 in order to broadcast itself as the Radio Emitting Object 160 that is representative of the Object Cloud 580.

In another implementation, a Radio Emitting Object 160 may have the ability to receive information in addition to having the capability of transmitting an ID signal. It should be noted that said Radio Emitting Object 160 might use more than one antenna to send and/or receive signals to and from the HMD 150 via a Wireless Communication Link 147. In this embodiment, one or more Objects 576-578 may act as a Radio Emitting Object 160, and send its respective ID signals that may be received by another arbitrary radio-emitting object within the Object Cloud 580. In one example, the ID signals received by said arbitrary radio emitting object are passed to a local or remotely stored lookup table. Accordingly, the attribute information associated with the Objects 576-578, located in Memory 512, can be added to the profile of said arbitrary radio emitting object. In another embodiment, the system may use pointer information to link the attribute information associated with the Objects 576-578 to the arbitrary radio emitting object. Specific attribute information of the Objects 576-578 may then be mathematically processed prior to sending AR indicia through the Display 154. For example, the mathematical process step may identify the aggregate number of Objects 576-578, or it may identify statistical average or rate information derived from Object 576-578 attribute information.

Figure 8:
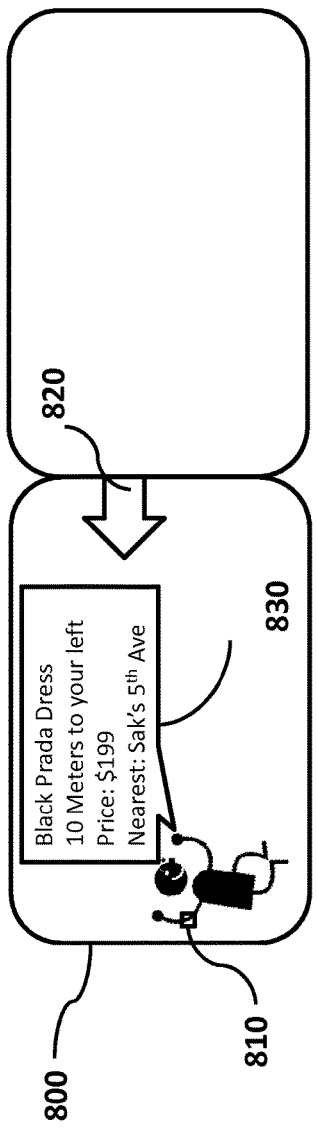
FIGS. 8, 9 and 10 show three exemplary commercial embodiments of the present invention as observed through the user's field of view.
Figure 9:
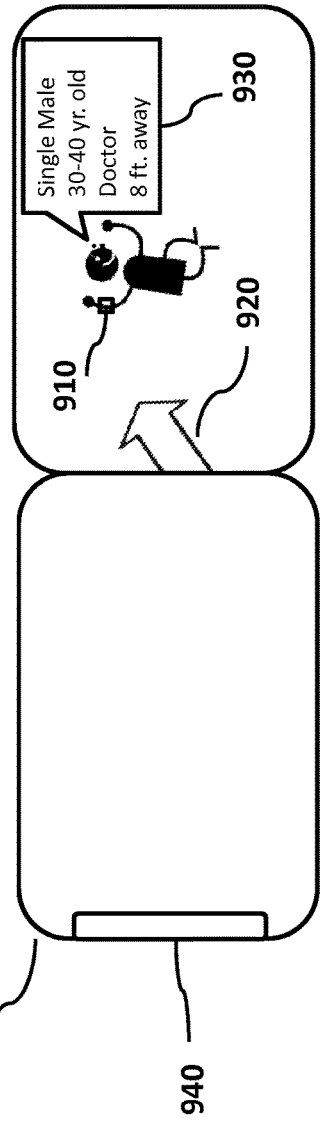
Figure 10:
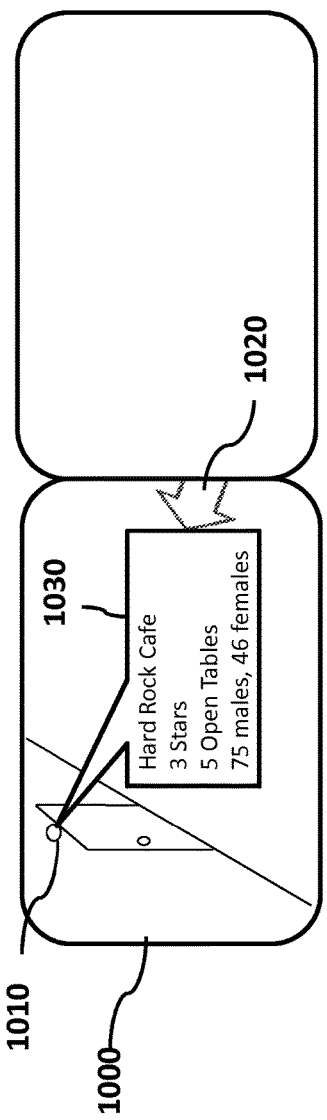

FIGS. 8-10 describe a series of commercial embodiments illustrating how a Display 154 of an HMD 150 may appear within a user's field of vision. In one implementation, lookup tables or a database can be located locally or remotely to identify which Radio Emitting Objects 160 the user would be interested in, authorized to, or mandated to view in real-time. In other words, while an HMD's multi-antenna arrangement may receive ID signals from a plurality of nearby Radio Emitting Objects 160, the HMD user, via Computer 505, may have specified that only a specific subset of ID signals would be relevant to said HMD user. Alternatively, a third party entity, for example, via Computer 506, may have specified which Radio Emitting Object ID signals can be "seen" by the HMD user.

Based on the ID signal being successfully matched to the HMD user's lookup table, the Display 154 may guide the user—via a pointing mechanism—to where a Radio Emitting Object 160 of interest is located. In one embodiment, the Display 154 may adjust the size of the pointing mechanism (e.g. arrow) based upon the detected proximity of the Radio Emitting Object 160 of interest. For example, the closer a Radio Emitting Object 160 of interest is located to the HMD 150 the larger a guiding AR arrow indicia may appear within Display 154. Conversely, when a Radio Emitting Object 160 of interest is located further in the distance, the guiding AR arrow indicia may appear smaller within the Display 154. In each of these cases, distance and directional information may be outputted to the HMD user via Display 154.

Likewise, in instances where detected and identified Radio Emitting Objects 160 of interest are not physically located within the field of view of the HMD user's Display 154, the Display may show an indication that said Radio Emitting Objects 160 are slightly behind or even directly behind the user. This indication may be in the form of a textual indication that may also include directional guidance (e.g. an arrow and distance information).

In one envisioned application, as soon as a Radio Emitting Object 160 is visualized within a Display 154, it may disappear after a specified amount of time. In another example, multiple Radio Emitting Objects 160 of interest may be simultaneously viewed through a Display 154, such that AR indicia may persist while other AR indicia newly appear to the user. In this case, once a Radio Emitting Object 160 of interest to an HMD user is successfully matched within the HMD user's lookup table, a Display 154 may indicate the newfound presence of said Radio Emitting Object 160 via a number of different alert mechanisms which could include the AR indicia appear in a different color, a different size, or with a flashing or blinking representation.

For each of the above guidance-based embodiments, the information shown via a Display 154, including the AR indicia and directional mechanisms, can be processed and retrieved locally from the HMD 150 itself or from a remote server, depending upon the configuration of entire system as previously discussed.

In one commercial embodiment, business offers may be communicated through an advertising focused application. Corresponding to the system presented in FIG. 1, a grocery store patron may pick up an HMD 150 upon entering the grocery store before placing the HMD 150 on his or her head. In this application, each grocery item that has a 50% discount can be associated with a respective Radio Emitting Object 160, which then transmits signals to all of the HMDs 150 that are worn by patrons within the grocery store. By way of example, a patron may be notified via HMD 150 that store-made Penne Rigate is on sale. Other indicia may be presented within the Display 154 in relation to the Penne Rigate including price information, duration of the discount, and other product-specific identification details. Before exiting the store, the user can simply drop off the HMD 150, which can then be used by another patron. In this example, HMD 150 acts similarly to traditional 3D glasses that have been used in movie theaters for decades. In other words, the user can temporarily use the HMD 150 during a visit and simply return the HMD 150 upon exit.

In a second example of an advertising application of the present invention, a connected HMD 150 may employ condition-based filtering of radio emitting object signals and identification.

FIG. 8 describes an example in which Alice may have previously specified that she only wishes to receive radio emitting object signals from nearby women wearing clothing items originating from her favorite designers. Particularly, Alice may have set forth in her online profile associated with her HMD 150 that she only wishes to be notified about clothing items designed by Giorgio Armani, Versace, Dolce & Gabbana, Gucci, Chanel, and Prada items (for the purposes of staying informed of her favorite designers' clothing). For instance, Alice may be walking down $5^{th}$ Avenue in Manhattan, and subsequently be notified via AR Indicia 830 within Display 800, that an agent for Prada is wearing a Prada dress 10 meters directly to Alice's left. Here, the Radio Emitting Object 810, whose ID is associated with said designer clothing item, is successfully passed through the HMD user's filter. Subsequently, a user may be guided to the location of the Radio Emitting Object 810 using indicia such as Indicia Arrow 820. In one implementation, Indicia Arrow 820 will serve the purpose of alerting user that in a certain direction there is an AR Indicia 830 that can be visualized. Once said AR Indicia 830 is visualized, said Indicia Arrow may disappear.

AR Indicia 830 within Display 800 may also include the year the clothing item was made, purchase price, nearest retailer carrying the dress, discount and/or promotional information, website information, and any other data stored within the profile corresponding to the transmitting Radio Emitting Object 810. AR Indicia 830 may include instructions for allowing user to purchase the item associated with Radio Emitting Object 810, in her size, on-the-spot, thereby facilitating a user friendly consumer-to-consumer form of advertisement and ecommerce.

Continuing the above example, user may be capable of setting other cloud-originating filters, or conditions, which enable or disable the display of received AR Indicia 830, associated with received radio emitting object signals via a Computer 505. Other parameters may include time-based conditions, which, for example, may specify that a user is only allowed receive AR Indicia 830 during weekend hours. Continuing with this example, an authority may be able to specify said time-based conditions for when a user may view AR indicia 830 associated with Radio Emitting Object 810 within Display 800. Accordingly, hierarchal and third party inputs can be integrated within the present invention so that AR indicia may obey rules that favor business practices. For example, an authority may be able to modify and control the price information in AR Indicia 830 via inputs of Computer 506.

FIG. 9 describes another commercial embodiment where HMD users can use the present invention for dating purposes. In this example, a woman may want to visualize AR Indicia 930 that are associated with single 30-40 year old males who are located in her proximity via the cloud-based input mechanism previously discussed. Secondly, she may also specify that she only wants to be notified during certain time-based windows.

As illustrated in FIG. 9, a 35 year old single male (who is carrying Radio Emitting Object 910, e.g. a smart phone, and has a profile whose privacy settings allow the visualization of AR Indicia 930), may trigger AR Indicia 930 in the HMD user's Display 900. Indicia Arrow 920 may guide said user, via a pop-up message, to position the Radio Emitting Object 910 within the user's field of view and keep it long enough to trigger the AR visualization.

In one implementation, an Out of Field Indicator 940 may signal to the user that a radio emitting object that, e.g., has not been rendered or displayed yet by the HMD is outside the field of view and to the left.

FIG. 10 describes another commercial embodiment wherein a Radio Emitting Object 160 transmits an ID that is associated with synthesized information in real-time. In one embodiment, as a user passes a Hard Rock Café restaurant, a Master Radio Emitting Object 1010 located above the entrance of the establishment (e.g. over the doorway) may emit an ID signal that is associated with summarized information about the public establishment.

In this embodiment, Indicia Arrow 1020 may guide the user to Master Radio Emitting Object 1010 within Display 1000. AR Indicia 1030 may convey not only the establishment's profile (e.g. restaurant name and rating) but also the aggregated data of the objects inside (e.g., gender of patrons and open tables), and positional information to the Master Radio Emitting Object 1010 (e.g. distance and direction). Here, both patrons and objects have been identified as being present in the Hard Rock Object Cloud 580 by way of GPS, Internet-based selection, RFID, or any other location determining mechanism known to one of ordinary skill in the art. As technically supported previously in the specification, the multiple patrons and table information currently located within the Hard Rock establishment may be stored by way of a lookup table in Memory 512, and subsequently loaded into the profile of the Master Radio Emitting Object 1010. Per the embodiment above, the availability of tables as well as restaurant patron information are aggregated and sent by virtue of the ID signal emitted by a Master Radio Emitting Object 1010. This synthesized information can subsequently be outputted to a Display 1000 via AR Indicia 1030 in real-time.

In one implementation, the synthesized information may be representative of the type of people inside the public place and give a passer-by user an indication that, for example, a person of interest is located inside that establishment.

Another commercial example of a synthesized group-based radio emitting object emission may exist in the supply chain environment. For example, a shipping pallet can comprise two types of packaged items. An operations manager can look at the pallet by way of an HMD and observe the real-time synthesized information of said pallet's contents. In the above embodiment, a specific Radio Emitting Object 160 can act as the Master Radio Emitting Object 570. Alternatively, an individual Radio Emitting Object 160 can assume the role of a Master Radio Emitting Object 570 based on one more conditions being met, which may include memory and processing capabilities, proximity, among other qualifiers.

With reference to FIG. 11, an HMD may integrate an Antenna Array 1102 into any one or more of the left temple portion, right temple portion, or front temple portion regions. The Antenna Array 1102 may comprise one or more antennas. In this example, the Antenna Array 1102 comprises a First Antenna 1103, a Second Antenna 1104, a Third Antenna 1105, and a Fourth Antenna 1106. In the embodiment shown in FIG. 11, the individual antennas within the Antenna Array 1102 may be situated along different axes and be contained in the same plane. As observed in FIG. 11, the right temple portion region of the HMD 150 integrates an Antenna Array 1102 comprised of a First Antenna 1103, a Second Antenna 1104, a Third Antenna 1105, and a Fourth Antenna 1106, each of which is directed outward from the HMD 150 along different axes. By integrating an Antenna Array 1102 directed outward from the HMD 150, the HMD 150 can achieve higher resolution in the vertical plane when determining the locations of the Radio Emitting Objects 160 in front of the HMD user. Specifically, through the operation of the Antenna Array 1102 positioned as described in FIG. 11, HMD 150 may determine a direction of arrival via measurements of Vertical Angle 1201. For example, if Fourth Antenna 1106 receives an ID signal which has a lower gain when compared to the same ID signal received by the First Antenna 1103, the Radio Emitting Object 160 is positioned at a Vertical Angle 1201 below the horizon.

FIG. 12 depicts at least one of a Gyroscope 1208 and an Accelerometer 1240 being integrated directly or indirectly to the HMD 150. One skilled in the art would appreciate that the Gyroscope 1208 uses the Earth's gravitational pull to determine the orientation of the device. The same person skilled in the art would also appreciate that an Accelerometer 1240, e.g. three-axis accelerometer, determines non-gravitational acceleration. Each of the Gyroscope 1208 and the Accelerometer 1240 can be singularly, or jointly, used to determine the orientation of the HMD 150. FIG. 12 also depicts the integration of an image capturing component, or Camera 1209. Camera 1209 can be used in conjunction with the HMD 150 such that images can be stored and processed at the HMD 150 or at a Remote Server 500. There are many methods to perform image recognition and to organize AR indicia. Some of these methods are disclosed in the following patents and applications: JP2015007632, US2011161875, US2011173576, US2012019557, US2012075341, US2012092369, US2013088516, US2013335301, US2014168056, US2014168262, US2014267419, US2014292653, US2014368533, US2015116316, U.S. Pat. No. 8,723,888, and U.S. Pat. No. 9,002,400. All of these references are hereby incorporated as part of this disclosure.

To optimize the placement of AR Indicia 1207 within the HMD 150, the invention may rely on the orientation of the HMD 150 as well as a location correction (or offset) corresponding to the Radio Emitting Object 1206.

In one implementation, the invention identifies correction data corresponding to a location relative to a Radio Emitting Object 1206. Here, the correction data may constitute angles relative to the Radio Emitting Object 1206 location. A Polar coordinate system (or spherical coordinate system) may be used to represent the location of the correction data, while in other cases, a Cartesian coordinate system may be used. In an embodiment, also shown in FIG. 12, the HMD 150 may determine an Azimuth Angle 1202 and a Vertical Angle 1201 (also referred to as elevation angle, or altitude angle) based upon the HMD's receiving, comparing, and processing of the electromagnetic radio emissions from the Radio Emitting Object 1206. By solely eliminating the Vertical Angle 1201, the AR Indicia associated with the Radio Emitting Object 1206 may be more optimally viewed within the HMD 150, as if it was located at Point 1241. Accordingly, a Radio Emitting Object 1206, that is worn on a user's wrist in this example, is displayed along the HMD user's eye level, such that identified radio emitting objects within the FOV of the HMD 150 (e.g. Radio Emitting Object 1206) are always located along the user's eye-level. This embodiment can be useful in situations where users may have mobile phones in their pockets. Here, it may be more desirable to display AR Indicia 1207 at the approximate level of the HMD wearer's eyes rather than having it overlap said pocket.

In some implementations, the corrections applied can also depend on a Distance 1230 value. For example, if Distance 1230 is below a certain threshold, an additional Azimuth Angle 1202 correction can be applied which causes the Radio Emitting Object 1206 to appear on the HMD's display as AR Indicia 1207. The person skilled in the art will understand that many variations are possible. For example, the ID code that is emitted by Radio Emitting Object 1206 can be associated with instructions pertaining to the display of AR Indicia 1207 associated with said Radio Emitting Object 1206. In some cases, corrections can be predetermined, and in other cases, they can be dependent on measurements and/or data acquired by HMD 150 such as the Distance 1230 value (for example by means of iBeacons measurements).

In certain implementations, a hierarchical approach can be implemented. For example, if the processing of images derived from Camera 1209 fails to determine an appropriate position for the AR indicia associated with Radio Emitting Object 1206 because a predetermined shape is not recognized, alternative methods may be employed. The hierarchical system may mandate that in the event a top-level method does not reach a predetermined level of accuracy, methods that are in a lower position in the hierarchy of methods can be implemented. For example, if image recognition fails, a default correction can be applied such as the eliminating of the Vertical Angle 1201.

Figure 13:
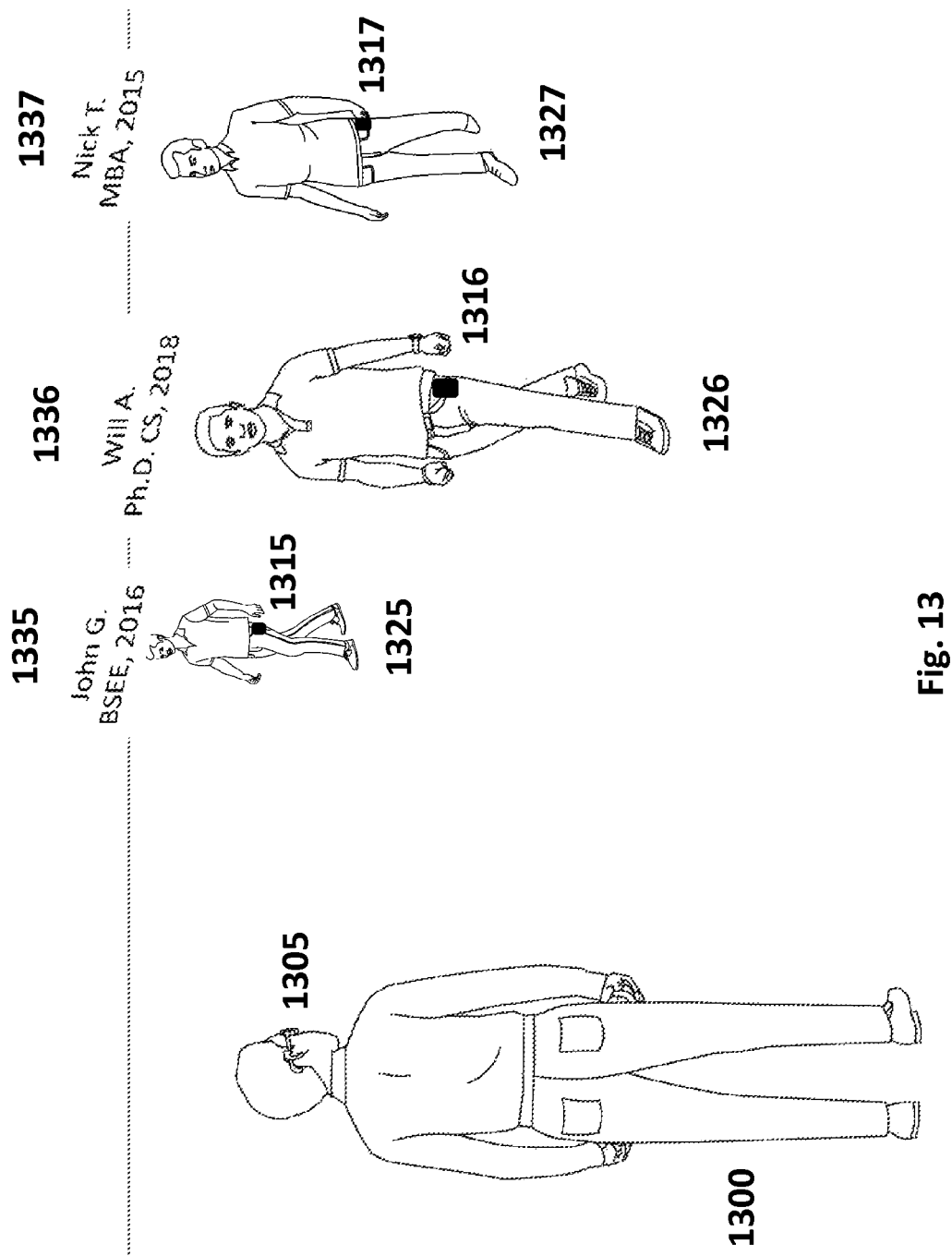
FIG. 13 describes an example in which vertical angles associated with nearby Radio Emitting Objects are eliminated.

FIG. 13 depicts a generic user such as User 1300 wearing a HMD 1305 peering out across the university quad. The User 1300 is able to identify AR Indicia 1335-1337 associated with local Students 1325-1327 based upon his HMD's processing of their associated ID signals emitted from their respective Radio Emitting Objects 1315-1317. Similar to the implementation described in FIG. 12, a Vertical Angle 1201 can be eliminated such that the AR Indicia 1335-1337 associated with local Students 1325-1327 is situated on a common plane (i.e. user's eye level) within the HMD 1305.

Figure 14:
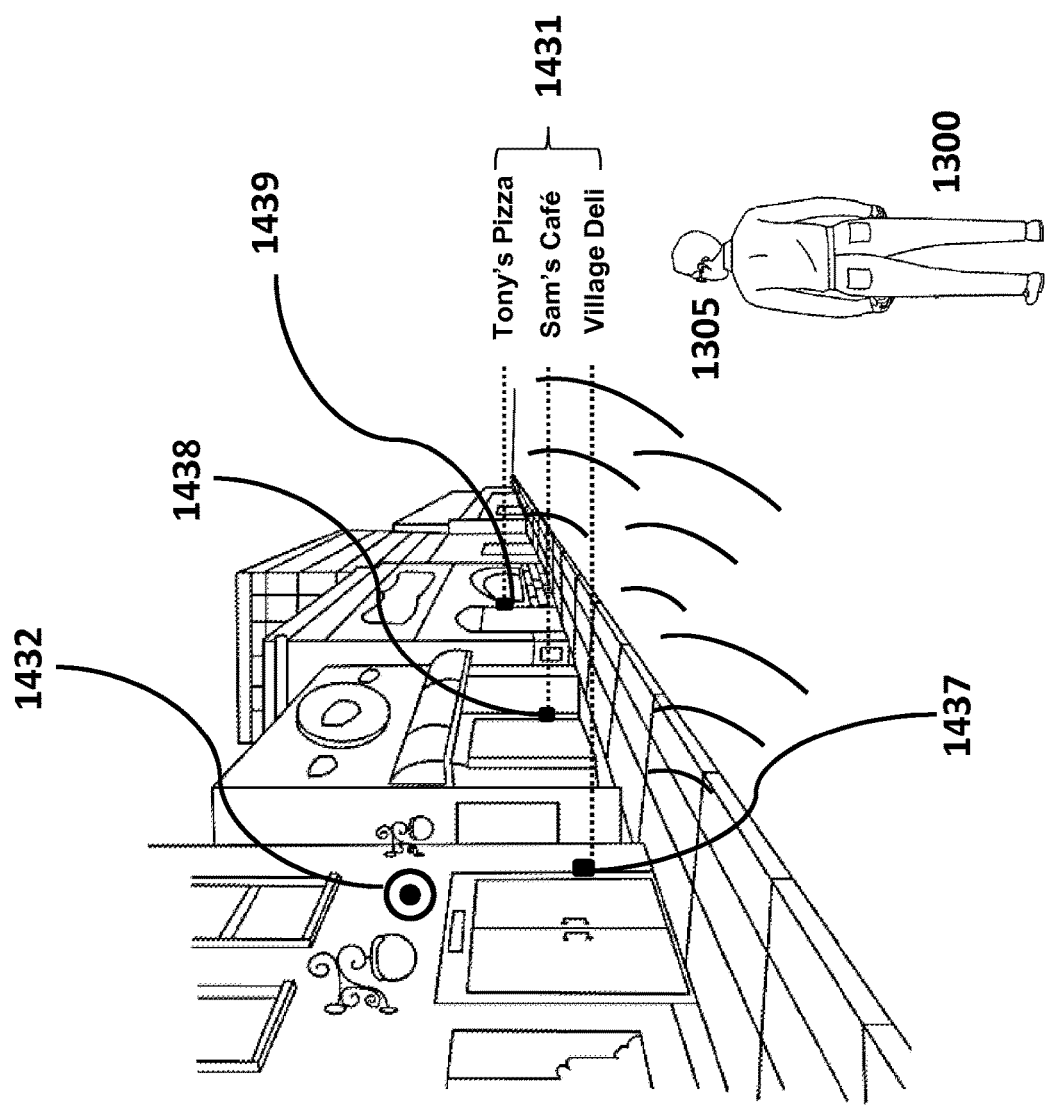
FIG. 14 provides an example where horizontal corrections are performed to display corresponding AR indicia along a vertical axis.

As shown in FIG. 14, the HMD 1305 associated with User 1300 can eliminate a horizontal angle corresponding to Radio Emitting Objects 1437-1439. In this case, the AR Indicia 1431 to be outputted through a user's HMD 1305 are displayed along the same vertical axis. In other words, the system generates a separate offset for each of the Radio Emitting Objects 1437-1439 such that the HMD 1305 outputs AR Indicia 1431 along a common vertical axis).

In certain implementations, if the direction of arrival of multiple Radio Emitting Objects 1437-1439 is determined by the system to be within a certain predetermined angle from each other, the AR Indicia 1431 can be positioned on a common vertical axis and organized according to perceived distance. For example, in consideration of Radio Emitting Objects 1437-1439, the objects that are positioned further away are going to be stacked on top or the AR list of indicia. In the case of FIG. 14 Tony's Pizza, which is associated with Radio Emitting Object 1439, is perceived as the object that is the furthest away.

In some implementations, anchor points such as Anchor Point 1432 can be implemented. By using predefined shapes or patterns, HMD 1305 may place the AR Indicia 1431 on top of said Anchor Point 1432, or alternatively in a predefined position relative to said Anchor Point 1432. For example, if Radio Emitting Object 1437 was determined to be in the FOV of HMD 1305, the AR Indicia 1431 associated with said Radio Emitting Object 1437, in one implementation, would be placed, for example on top of Anchor Point 1432. Anchor Point 1432 can be implemented though shapes as in FIG. 14 or by means of predetermined colors, patterns, or combinations thereof. In one implementation, the HMD 1305 would simply append the AR Indicia 1431 on top of the Anchor Point 1432 in the field of view.

In a system implementation relying on Polar coordinates, at least one of an azimuthal correction or a vertical correction can be established to optimize the display of the AR display within the HMD 150. Additionally, a correction angle may be incorporated to specify along what axis the AR indicia should be placed relative to a reference plane associated with the Radio Emitting Object 160. An X-Y reference plane that is parallel to the Earth's surface is one such example. In an embodiment, the correction distance and correction angle can be combined to form a correction vector that may be stored with data corresponding to the Radio Emitting Object 160.

In some implementations, corrections can be linked to a position data of the HMD 1305. A database can store associations of positions and predetermined corrections both vertical and horizontal. Position data can be determined via the use of a GPS or other indoor or outdoor positioning system.

It should also be appreciated that in addition to altitude, or elevation, corrections, horizontal or depth corrections may be implemented to optimize the display of the AR indicia within the HMD 150. As such, if using the Cartesian coordinate system, correction data can be positioned at an offset in the X or Y directions relative to the identified location of the Radio Emitting Object 160. Ultimately, the correction data can established using any combination of X, Y, or Z axis offsets.

A Radio Emitting Object's correction data may be based upon its proximity to other nearby reference points. The reference point may be a nearby structure with transmitting capabilities, e.g. one or more antennas. In one example, a HMD user is alerted to a second HMD user located in the vicinity. This is based upon the second HMD user's corresponding Radio Emitting Object 160, which could be in the form of a smartphone located in his pants' pocket. In this embodiment, the correction data may be calculated based upon Bluetooth measurements used to identify the relative location of the second HMD to the smartphone, or Radio Emitting Object 160).

In another embodiment similar to the implementation associated with FIG. 12, the reference data may be determined at the HMD 150. Much like a gyroscope is used in the cockpit of an airplane, the Gyroscope 1208 can be used to determine the horizon. Using the horizon as a reference plane, the invention may specify that all AR indicia associated with local Radio Emitting Objects 160 are displayed at some preset distance that is offset from the horizon. In this case, the HMD 150 relies on the orientation of HMD 150, the reference plane determined at the HMD 150, and the location of the Radio Emitting Object 160 determined via the multi-antenna system at the HMD 150. In other words, the AR indicia associated with one or more Radio Emitting Objects 160 within the field of view is affixed to the same altitude or elevation angle within the HMD 150.

In yet another embodiment, image recognition data, captured from a Camera 1209 integrated into the HMD 150, can be used as reference data. Specifically, the system can take into consideration predetermined real life shapes positioned in the field of view of said HMD 150 regardless if the Radio Emitting Object 160 is stationary or non-stationary. If a Radio Emitting Object 160 is associated with another person, the predetermined real life shapes may comprise attributes such as a person's head, shoulders, hands, etc. The real life shapes can be associated with inanimate reference points as well, including, but not limited to regions on buildings, vehicles, and natural structures. As already disclosed, the ID code associated with the Radio Emitting Object 160 can be associated with information useful to apply a predetermined optimal method for the offsetting of AR indicia.

FIGS. 15-17 illustrate multiple perspectives from the same scene comprising two people walking past one another.

In the side view depicted in FIG. 15, the HMD Owner 1500, with his corresponding HMD 1505, walks past a Second Person 1501 who is carrying a Radio Emitting Object 1504, in the form of a smartphone. The multiple antennas connected with the HMD 1505 allow for the location of the Radio Emitting Object 1504 to be identified after the processing of the associated ID signals. However, in this example, correction data has been established at a Distance 1510 from the Radio Emitting Object 1504. As illustrated here, the offset is purely vertical such that AR indicia can be displayed directly above the user at AR Indicia Position 1515, as opposed to directly on the hip of the Second Person 1501.

In the aerial view depicted in FIG. 16, the HMD Owner 1500 is shown walking past a Second Person 1501. From this vantage point, one can recognize that the Radio Emitting Object 1504 is located at a Distance 1611 away from the center point of the Second Person 1501. Accordingly, correction data can be established such that the AR indicia associated with Radio Emitting Object 1504 can be offset a Distance 1611 directly over the center point of the Second Person 1501 at AR Indicia Position 1515.

The perspective view illustrated in FIG. 17 combines both side view and aerial views shown across FIGS. 15 and 16, respectively. Here, the AR Indicia Position 1515, by way of correction data, is established at a Distance 1510 above the Radio Emitting Object 1504 and a Distance 1611 away from the Radio Emitting Object 1504. This ultimately allows the AR indicia to be displayed directly above the center point of the object associated with the Radio Emitting Object 1504. It should be noted that the invention also encompasses correction data that may also may be moved forward or backward as well. In other words using this example, the correction data may indicate that the AR indicia should be positioned in front of the user (e.g. over the top of the hairline), or toward the back, or behind the user. In some implementations, the corrections can be the result of an image recognition processing method. In other implementations, certain preset values and techniques can be adopted so that for example the elimination of a vertical angle will produce Distance 1510. In other implementations, the recognition of a head will trigger Distance 1611.

In some implementations, a Radio Emitting Object's correction data may be preset by an entity such that correction data specifies an exact region where the AR indicia associated with the nearby Radio Emitting Object 160 will be displayed. The entity may be a Radio Emitting Object owner, manager, service provider, or operator. Likewise, the entity may be the HMD user or a separate third-party altogether. Here, in a Cartesian coordinate system example, X, Y, and Z coordinates of the correction data may be inputted by the entity establishing the virtual points.

One possible scenario may involve a retail owner who has predetermined the bounding area of where his patrons will be able to observe the AR indicia of the corresponding Radio Emitting Object 160 (i.e. retail product). There are many reasons in which one may wish to preset this correction data to point to a certain area within the HMD's display. The owner may want to draw attention to a specific area of a display section on or nearby by the associated Radio Emitting Object 160. The owner may set the AR indicia boundaries in order to eliminate possible AR indicia clutter occurring in his patron's HMD 150.

One implementation of the invention takes into account the correction data corresponding to a Radio Emitting Object 160 and the orientation of the HMD 150. Practically, as described previously, the correction data corresponding to a Radio Emitting Object 160 can come from different sources, such as from the HMD 150 itself (e.g. image recognition) or from the profile information associated with the ID signal of the Radio Emitting Object 160. If the Gyroscope 1208 determines that the HMD 150 is tilted (e.g. the user of the HMD 150 may be laying down), the system may need to combine the correction data with the determined orientation of the HMD 150. Specifically, once the correction data associated with a Radio Emitting Object 160 is established at the HMD 150, the correction data may then be rotated based upon the determined orientation of the HMD 150. Accordingly, any textual or other visual representation of the AR indicia may be rotated and subsequently displayed within the output of the HMD 150.

In many examples, the correction data associated with the Radio Emitting Objects 160 may be wirelessly transferred to the HMD 150. For example, the HMD 150 may receive correction data via Wi-Fi, Bluetooth, wireless USB, Infrared, or any other comparable connectivity technology from a remote storage location. Accordingly, prior to the wireless delivery of the correction data to the HMD 150, the correction data can be stored at any number of devices. For example, a HMD user's smartphone may store, permanently or temporarily, the correction data of nearby Radio Emitting Objects 160. In one scenario, a smartphone may serve as an intermediate device which receives the correction data of a Radio Emitting Object 160 via a Wi-Fi or LTE connection. Subsequently, the smartphone may send over a Bluetooth signal to link the correction data to the user's HMD 150.

The HMD wireless transfer capabilities of the HMD 150 allows for aperiodic and periodic updating. In some cases, it may be advantageous for correction data to be updated on an ad hoc, or infrequent, basis. For example, a retail business owner whose store carries products (serving as Radio Emitting Objects 160) may specify precisely when and where his products' corresponding AR indicia should appear with the HMD of its patron. Moreover, the correction data updating can be triggered by certain events. For instance, the retail business owner may only need to perform a correction update when a new shipment of product comes in or when a product is out of stock. The retail business owner may also perform the correction update regardless if a condition is met or not. The retail business owner may simply wish to add or alter the correction data associated with one or more Radio Emitting Objects 160 (e.g. to optimize the AR indicia display).

The correction updates may also take place periodically. While daily, hourly, or real-time updating may take place, any periodic measure of time can be utilized. When Radio Emitting Objects 160 are non-stationary in nature, correction data updating on a real-time basis may be a preferred implementation. It would be undesirable for an HMD user to see outdated AR indicia associated with a Radio Emitting Object 160, especially in instances when the Radio Emitting Object 160 has traveled any considerable distance.

In other implementations, the correction data associated with Radio Emitting Objects 160, can be uploaded to the HMD 150 directly via a hardwired cable. For example, the HMD 150 can receive at least one of a hardwired cable including, but not limited to a USB (e.g. USB 3.1) or Thunderbolt cable, in order to receive correction data associated with Radio Emitting Objects 160. Accordingly, the HMD 150 may integrate the corresponding ports to accommodate hardwire connections, such as, but not limited to, USB Type-C, USB 3.0, and Micro USB ports. The person skilled in the art will understand that a cable can also be used to update all the associations between Radio Emitting Objects 160 and AR indicia in general. This is particularly useful in case of a HMD apparatus lacking wireless connectivity to update data in real time or periodically.

The person skilled in the art will also understand that AR indicia include a wide variety of media including, but not limited to, text, avatars, images, animations, and videos that can be triggered and displayed by the reception of the code ID by HMD 150. In some cases these rich AR indicia can be stored in the HMD 150, in other cases they can be downloaded when needed or when entering a predetermined zone.

Without in any way limiting the scope, interpretation, or application of the claims appearing below, a technical effect of one or more of the example embodiments disclosed herein is allowing consumers to be more informed about their surroundings. By providing consumers a mechanism to understand objects of interest, from specific people to retail items, in their local vicinities, they become much more immediately informed. Another technical effect of one or more of the example embodiments disclosed herein is allowing interactions, such as meet-ups and ecommerce transactions, to take place outside traditional methodologies. Another technical effect of one or more of the example embodiments disclosed herein is providing an awareness of multiple objects or people of interest within a given environment at any given time, such that a synthesis of multiple objects or people can be displayed to the user.

Embodiments of the present invention may be implemented in software, hardware, application logic or a combination of software, hardware and application logic. The software, application logic and/or hardware may reside on mobile computer equipment, fixed equipment or servers. If desired, part of the software, application logic and/or hardware may reside on multiple servers and equipment in charge of different processes.

The person skilled in the art will understand that elements of traditional augmented reality apparatuses like, positioning systems, gyroscopes, compasses can be used to refine the disclosed functionalities or provide added functionalities to the radio based implementation that is one of the objects of this application.

In addition, the person skilled in the art will understand that even if many exemplary embodiments are about a head mounted display, the principles and concepts behind the present invention can be applied with reference to any display capable of representing the association between a direction of arrival of a radio wave and augmented reality indicia. These may include eyeglasses, contact lenses, virtual retina display, Eye Tap, handheld.

Virtual retina display is described, e.g., in Tidwell, Michael; Johnson, Richard S.; Melville, David; Furness, Thomas A. The Virtual Retinal Display—"A Retinal Scanning Imaging System, Human Interface Technology Laboratory, University of Washington".

Eye Tap is described, e.g., in "GlassEyes": The Theory of EyeTap Digital Eye Glass, supplemental material for IEEE Technology and Society, Volume Vol. 31, Number 3, 2012, pp. 10-14.

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications, which may be made without departing from the scope of the present invention as, defined in the appended claims.

The invention claimed is:

1. A method comprising: receiving electromagnetic signals from a radio-emitting object by a plurality of antennas positioned on a head-mounted apparatus that is configured to deliver augmented reality indicia, wherein:
   a) said electromagnetic signals are carrying a code;
   b) said plurality of antennas exhibits radiation gain patterns that are substantially predetermined in the absence of a user's head;
   c) a first antenna of said plurality of antennas is placed on a right temple of said head-mounted apparatus and exhibits a first radiation gain pattern that, absent interfering material, is toroidal and is associated with a first minimum gain toward a forward looking direction of said head-mounted apparatus;
d) a second antenna of said plurality of antennas is placed on a left temple of said head-mounted apparatus and exhibits a second radiation gain pattern that, absent interfering material, is toroidal and is associated with a second minimum gain toward said forward looking direction of said head-mounted apparatus;
e) a third antenna of said plurality of antennas is placed on a front portion of said head-mounted apparatus and exhibits a third radiation gain pattern associated with a maximum gain toward said forward looking direction of said head-mounted apparatus;
determining, as a result of comparing at least a subset of signal strength data values of said electromagnetic signals as received at each one of said plurality of antennas, positional information pertaining to said radio-emitting object, whereby said radiation gain patterns are affected by the shielding of said user's head for the purpose of determining said positional information such that said first minimum gain, said second minimum gain, and said maximum gain provide points of reference for determining when said radio-emitting object is in the field of view of said head-mounted apparatus based, at least in part, on readings of said signal strength data values as received at said first antenna, said second antenna and said third antenna;
wherein, when the signal strength of said electromagnetic signals associated with said first antenna and said second antenna is minimal and the signal strength of said electromagnetic signals received by said third antenna is at a maximum, said radio emitting object is in the field of view of said head-mounted apparatus;
generating said augmented reality indicia based on associations between said augmented reality indicia and said code, wherein said associations are stored in at least one memory;
enabling, according to a predetermined criterion, the outputting of said augmented reality indicia, when said positional information indicates that said radio-emitting object is within the field of view of said head mounted apparatus.

2. The method of claim 1, wherein said code is associated with said predetermined criterion.

3. The method of claim 2, wherein said code is associated with content selected from the group consisting of: said radio-emitting object is a non-stationary object, said radio-emitting object is a stationary object, said radio-emitting object is emitting according to a preset radiation power, said radio-emitting object is representative of multiple radio-emitting objects, and combinations thereof.

4. The method of claim 1, wherein said predetermined criterion consists of eliminating an elevation angle so that visual augmented reality indicia are represented in proximity of a horizontal plane that comprises said head-mounted apparatus.

5. The method of claim 1, wherein said predetermined criterion consists of positioning visual augmented reality indicia on a head-mounted display that is part of said head-mounted apparatus taking into account an anchor point.

6. The method of claim 1, wherein said head-mounted apparatus produces indicia indicating the direction of arrival of said electromagnetic signal and thus directs a user to adjust the orientation of said field of view to facilitate said outputting of said augmented reality indicia.

7. The method of claim 1, wherein said predetermined criterion consist of correcting said outputting of said augmented reality indicia using data selected from the group consisting of: an elevation angle, a horizontal angle, a distance data, a radiation power data and combinations thereof.

8. An apparatus comprising:
at least one processor; and
at least one non-transitory computer-readable medium including computer program code;
the at least one non-transitory computer-readable medium and the computer program code configured to, with the at least one processor, cause the apparatus to perform at least the following:
receiving electromagnetic signals from a radio-emitting object by a plurality of antennas positioned on a head-mounted apparatus that is configured to deliver augmented reality indicia, wherein:
a) said electromagnetic signals are carrying a code;
b) said plurality of antennas exhibits radiation gain patterns that are substantially predetermined in the absence of a user's head;
c) a first antenna of said plurality of antennas is placed on a right temple of said head-mounted apparatus and exhibits a first radiation gain pattern that, absent interfering material, is toroidal and is associated with a first minimum gain toward a forward looking direction of said head-mounted apparatus;
d) a second antenna of said plurality of antennas is placed on a left temple of said head-mounted apparatus and exhibits a second radiation gain pattern that, absent interfering material, is toroidal and is associated with a second minimum gain toward said forward looking direction of said head-mounted apparatus;
e) a third antenna of said plurality of antennas is placed on a front portion of said head-mounted apparatus and exhibits a third radiation gain pattern associated with a maximum gain toward said forward looking direction of said head-mounted apparatus;
determining, as a result of comparing at least a subset of signal strength data values of said electromagnetic signals as detected at each one of said plurality of antennas, positional information pertaining to said radio-emitting object, whereby said radiation gain patterns are affected by the shielding of said user's head for the purpose of determining said positional information such that said first minimum gain, said second minimum gain, and said maximum gain provide points of reference for determining when said radio-emitting object is in the field of view of said head-mounted apparatus based, at least in part, on readings of said signal strength data values as received at said first antenna, said second antenna and said third antenna;
wherein, when the signal strength of said electromagnetic signals associated with said first antenna and said second antenna is minimal and the signal strength of said electromagnetic signals received by said third antenna is at a maximum, said radio emitting object is in the field of view of said head-mounted apparatus;
generating said augmented reality indicia based on associations between said augmented reality indicia and said code, wherein said associations are stored in at least one memory;

enabling, according to a predetermined criterion, the outputting of said augmented reality indicia, when said positional information indicates that said radio emitting object is within the field of view of said head-mounted apparatus.

9. The apparatus of claim 8, wherein said electromagnetic signals are the result of an RF-ID interrogation.

10. The apparatus of claim 8, wherein said memory is contained in said head-mounted apparatus.

11. The apparatus of claim 8, wherein said augmented reality indicia associated to said code are updated and are wirelessly retrieved by said head-mounted apparatus.

12. The apparatus of claim 8, wherein said augmented reality indicia associated to said radio-emitting object are hierarchically organized such that different layers of content are unlocked according to a time parameter associated with how long said radio-emitting object is kept within said field of view of said head-mounted apparatus.

13. The apparatus of claim 8, wherein a plurality of augmented reality indicia associated to a plurality of radio-emitting objects are positioned on a display associated to said head-mounted apparatus according to an elevation angle to represent a distance data associated with different radio-emitting objects belonging to said plurality of radio-emitting objects.

14. The apparatus of claim 8, wherein said radio-emitting object is configured to emit said electromagnetic signals according to criteria selected from the group consisting of: a time schedule, motion sensors activation, infrared sensors activation, acoustic sensors activation, temperature sensors activation and combinations thereof.

15. The apparatus of claim 8 further including means for resolving ambiguities associated to said positional information pertaining to said radio-emitting object.

16. At least one non-transitory computer-readable medium for controlling at least one digital apparatus in performing desired functions comprising a set of instructions formed into each of a plurality of modules, each modules comprising:
  a process for receiving electromagnetic signals from a radio-emitting object by a plurality of antennas positioned on a head-mounted apparatus that is configured to deliver augmented reality indicia, wherein:
  a) said electromagnetic signals are carrying a code;
  b) said plurality of antennas exhibits radiation gain patterns that are substantially predetermined in the absence of a user's head;
  c) a first antenna of said plurality of antennas is placed on a right temple of said head-mounted apparatus and exhibits a first radiation gain pattern that, absent interfering material, is toroidal and is associated with a first minimum gain toward a forward looking direction of said head-mounted apparatus;
  d) a second antenna of said plurality of antennas is placed on a left temple of said head-mounted apparatus and exhibits a second radiation gain pattern that, absent interfering material, is toroidal and is associated with a second minimum gain toward said forward looking direction of said head-mounted apparatus;
  e) a third antenna of said plurality of antennas is placed on a front portion of said head-mounted apparatus and exhibits a third radiation gain pattern associated with a maximum gain toward said forward looking direction of said head-mounted apparatus;
  a process for determining, as a result of comparing at least a subset of signal strength data values of said electromagnetic signals as received at each one of said plurality of antennas, positional information pertaining to said radio-emitting object, whereby said radiation gain patterns are affected by the shielding of said user's head for the purpose of determining said positional information such that said first minimum gain, said second minimum gain, and said maximum gain provide points of reference for determining when said radio-emitting object is in the field of view of said head-mounted apparatus based, at least in part, on readings of said signal strength data values as received at said first antenna, said second antenna and said third antenna;
  wherein, when the signal strength of said electromagnetic signals associated with said first antenna and said second antenna is minimal and the signal strength of said electromagnetic signals received by said third antenna is at a maximum, said radio emitting object is in the field of view of said head-mounted apparatus;
  a process for generating said augmented reality indicia based on associations between said augmented reality indicia and said code, wherein said associations are stored in at least one memory; and
  a process for enabling, according to a predetermined criterion, the outputting of said augmented reality indicia, when said positional information indicates that said radio emitting object is within the field of view of said head-mounted apparatus.

17. The non-transitory computer-readable medium of claim 16, wherein said radio-emitting object is associated to real time information pertaining to a commercial establishment.

18. The non-transitory computer-readable medium of claim 16, wherein said augmented reality indicia are generated according to a user profile that is associated to said head-mounted apparatus.

19. The non-transitory computer-readable medium of claim 16, wherein said code is associated with information selected from the group consisting of:
  said radio-emitting object is a non-stationary object, said radio-emitting object is a stationary object, said radio-emitting object is emitting according to a predetermined radiation power level, said radio-emitting object is representative of multiple radio-emitting objects, and combinations thereof.

20. The non-transitory computer-readable medium of claim 16, wherein said head-mounted apparatus produces indicia indicating the direction of arrival of said electromagnetic signal such that a user can regulate the orientation of said field of view of said head-mounted apparatus.

* * * * *